US011671941B2

(12) United States Patent
Lee et al.

(10) Patent No.: US 11,671,941 B2
(45) Date of Patent: Jun. 6, 2023

(54) METHOD AND APPARATUS FOR TRANSMITTING SIGNAL BY SIDELINK TERMINAL IN WIRELESS COMMUNICATION SYSTEM

(71) Applicant: LG ELECTRONICS INC., Seoul (KR)

(72) Inventors: Seungmin Lee, Seoul (KR); Hyukjin Chae, Seoul (KR); Kyuhwan Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 17/262,864

(22) PCT Filed: Jul. 26, 2019

(86) PCT No.: PCT/KR2019/009352
§ 371 (c)(1),
(2) Date: Jan. 25, 2021

(87) PCT Pub. No.: WO2020/022845
PCT Pub. Date: Jan. 30, 2020

(65) Prior Publication Data
US 2021/0243728 A1    Aug. 5, 2021

Related U.S. Application Data

(60) Provisional application No. 62/754,610, filed on Nov. 2, 2018.

(30) Foreign Application Priority Data

Jul. 26, 2018    (KR) .................. 10-2018-0087329

(51) Int. Cl.
*H04W 72/04*    (2023.01)
*H04W 72/02*    (2009.01)
(Continued)

(52) U.S. Cl.
CPC ....... *H04W 72/02* (2013.01); *H04W 72/0446* (2013.01); *H04W 72/0473* (2013.01); *H04W 72/10* (2013.01)

(58) Field of Classification Search
None
See application file for complete search history.

(56) References Cited

U.S. PATENT DOCUMENTS

2014/0185578 A1*    7/2014    Park .................. H04L 1/0046
370/329
2016/0095024 A1*    3/2016    Chae ................ H04W 36/0061
370/280
(Continued)

FOREIGN PATENT DOCUMENTS

WO    2016120109    8/2016
WO    2017017871    2/2017
WO    2017176098    10/2017

OTHER PUBLICATIONS

PCT International Application No. PCT/KR2019/009352, International Search Report dated Oct. 30, 2019, 18 pages.

*Primary Examiner* — Sai Aung
(74) *Attorney, Agent, or Firm* — Lee Hong Degerman Kang Waimey

(57) ABSTRACT

An embodiment of the present invention relates to a signal transmission method for transmitting a signal by a sidelink terminal in a wireless communication system, the method comprising the steps of: transmitting a physical sidelink control channel (PSCCH) by using a plurality of symbols in a slot; and transmitting a physical sidelink shared channel (PSSCH) related to the PSCCH, wherein the number of symbols used for the PSCCH transmission is changed according to a change in the number of symbols included in the slot.

12 Claims, 28 Drawing Sheets

(51) Int. Cl.
*H04W 4/40* (2018.01)
*H04W 72/0446* (2023.01)
*H04W 72/044* (2023.01)
*H04W 72/10* (2009.01)

(56) References Cited

U.S. PATENT DOCUMENTS

2016/0174174 A1\* 6/2016 Chae ................. H04W 52/0216
 370/350
2016/0174179 A1\* 6/2016 Seo ....................... H04W 76/23
 370/350
2016/0345312 A1\* 11/2016 Kim .................. H04W 72/0446
2017/0079084 A1 3/2017 Matsumoto
2017/0134146 A1\* 5/2017 Chae ..................... H04L 5/0092
2017/0295601 A1 10/2017 Kim et al.
2018/0302889 A1\* 10/2018 Guo ...................... H04B 7/088

\* cited by examiner

METHOD AND APPARATUS FOR TRANSMITTING SIGNAL BY SIDELINK TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2019/009352, filed on Jul. 26, 2019, which claims the benefit of KR Application No. 10-2018-0087329, filed on Jul. 26, 2018, and also claims the benefit of U.S. Provisional Application No. 62/754,610, filed on Nov. 2, 2018, the contents of which are all incorporated by reference herein in their entirety.

TECHNICAL FIELD

The present disclosure relates to a wireless communication system, and more particularly, to a method and apparatus for transmitting a control signal and data by a sidelink UE when the number of symbols included in a slot is variable.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

An object of the present disclosure is to provide a method for transmitting a control signal and data by a sidelink UE when the number of symbols included in a slot is variable.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, a method for transmitting a signal by a sidelink UE in a wireless communications system comprises the steps of transmitting a physical sidelink control channel (PSCCH) by using a plurality of symbols in a slot; and transmitting a physical sidelink shared channel (PSSCH) related to the PSCCH, wherein the number of symbols used for the PSCCH transmission is changed based on a change in the number of symbols included in the slot.

In another aspect of the present disclosure, a sidelink UE for transmitting or receiving a signal in a wireless communication system comprises a memory; and a processor coupled to the memory, wherein the processor transmits a physical sidelink control channel (PSCCH) by using a plurality of symbols in a slot, and transmits a physical sidelink shared channel (PSSCH) related to the PSCCH, and the number of symbols used for the PSCCH transmission is changed based on a change in the number of symbols included in the slot.

A relationship between the number of symbols included in the slot and the number of symbols used for the PSCCH transmission may be preconfigured, delivered through physical layer signaling or delivered through higher layer signaling.

A payload size of the PSCCH or a size of a resource block (RB) to which the PSCCH is transmitted may be changed based on the change in the number of symbols included in the slot.

When the PSCCH is subjected to FDM with the PSSCH in at least a portion of the slot, a transmission power used for the PSCCH may be excluded from a total available transmission power and then a transmission power per RE of the PSSCH may be determined.

The determined transmission power may also be used for a transmission power per RE of PSSCH which is not subjected to FDM with the PSCCH in at least a portion of the slot.

MPR (Maximum Power Reduction) applied when the PSCCH is subjected to FDM with the PSSCH in at least a portion of the slot may be applied even in the case that the PSCCH is not subjected to FDM with the PSSCH.

The PSCCH may repeatedly be transmitted through at least one symbol in the slot.

The repeated transmission of the PSCCH may be performed when the symbols used for the PSCCH transmission are smaller than those used for the PSSCH transmission related to the PSCCH.

The repeatedly transmitted PSCCH may have a redundancy version (RV) of a preconfigured pattern.

The repeated transmission of the PSCCH or the preconfigured pattern may be indicated by a demodulation reference signal (DMRS) for the PSCCH.

The repeated transmission of the PSCCH or the preconfigured pattern may be indicated by DMRS base sequence set to a predetermined value or initialization ID.

The number of times for the repeated transmission may be determined by a UE, which transmits the PSCCH, by considering one or more of packet priority and packet arrival coverage.

Advantageous Effects

According to the present disclosure, control information and data may be transmitted effectively even in the case that the number of symbols in a slot is variable.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE INVENTION

1. Driving
(1) Exterior of Vehicle
FIG. 1 is a diagram showing a vehicle according to an implementation of the present disclosure.

Figure 1:
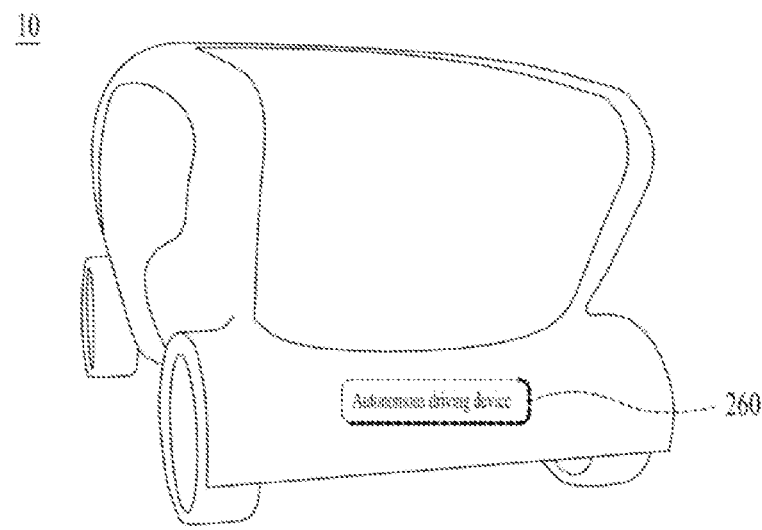
FIG. 1 is a view illustrating a vehicle according to the embodiment of the present disclosure.
Figure 1:
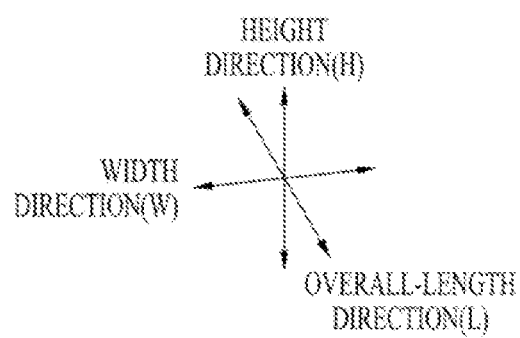

Referring to FIG. 1, a vehicle 10 according to an implementation of the present disclosure is defined as transportation traveling on roads or railroads. The vehicle 10 includes a car, a train, and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle or a shared vehicle. The vehicle 10 may be an autonomous vehicle.

Figure 2:
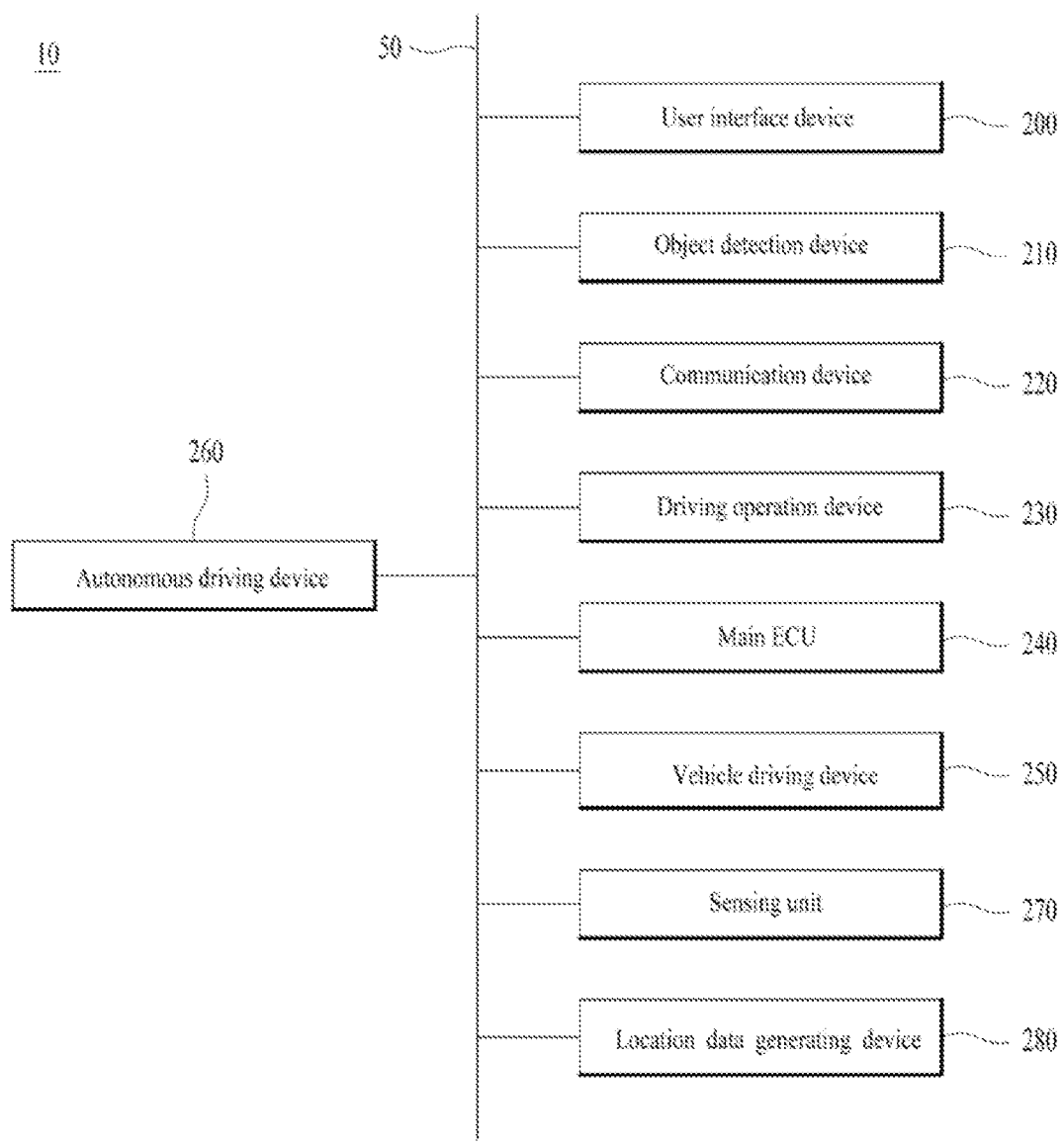
FIG. 2 is a control block view illustrating a vehicle according to the embodiment of the present disclosure.

(2) Components of Vehicle
FIG. 2 is a control block diagram of the vehicle according to an implementation of the present disclosure.

Referring to FIG. 2, the vehicle 10 may include a user interface device 200, an object detection device 210, a communication device 220, a driving operation device 230, a main electronic control unit (ECU) 240, a driving control device 250, an autonomous driving device 260, a sensing unit 270, and a location data generating device 280. Each of the object detection device 210, communication device 220, driving operation device 230, main ECU 240, driving control device 250, autonomous driving device 260, sensing unit 270, and location data generating device 280 may be implemented as an electronic device that generates an electrical signal and exchanges the electrical signal from one another.

1) User Interface Device
The user interface device 200 is a device for communication between the vehicle 10 and a user. The user interface device 200 may receive a user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device
The object detection device 210 may generate information about an object outside the vehicle 10. The object information may include at least one of information about the presence of the object, information about the location of the object, information about the distance between the vehicle 10 and the object, and information about the relative speed of the vehicle 10 with respect to the object. The object detection device 210 may detect the object outside the vehicle 10. The object detection device 210 may include at least one sensor to detect the object outside the vehicle 10. The object detection device 210 may include at least one of a camera, a radar, a lidar, an ultrasonic sensor, and an infrared sensor. The object detection device 210 may provide data about the object, which is created based on a sensing signal generated by the sensor, to at least one electronic device included in the vehicle 10.

2.1) Camera
The camera may generate information about an object outside the vehicle 10 with an image. The camera may include at least one lens, at least one image sensor, and at least one processor electrically connected to the image sensor and configured to process a received signal and generate data about the object based on the processed signal.

The camera may be at least one of a mono camera, a stereo camera, and an around view monitoring (AVM) camera. The camera may acquire information about the location of the object, information about the distance to the object, or information about the relative speed thereof with respect to the object based on various image processing algorithms. For example, the camera may acquire the information about the distance to the object and the information about the relative speed with respect to the object from the image based on a change in the size of the object over time. For example, the camera may acquire the information about the distance to the object and the information about the relative speed with respect to the object through a pin-hole model, road profiling, etc. For example, the camera may acquire the information about the distance to the object and the information about the relative speed with respect to the object from a stereo image generated by a stereo camera based on disparity information.

The camera may be disposed at a part of the vehicle 10 where the field of view (FOV) is guaranteed to photograph the outside of the vehicle 10. The camera may be disposed close to a front windshield inside the vehicle 10 to acquire front-view images of the vehicle 10. The camera may be disposed in the vicinity of a front bumper or a radiator grill. The camera may be disposed close to a rear glass inside the vehicle 10 to acquire rear-view images of the vehicle 10. The camera may be disposed in the vicinity of a rear bumper, a trunk, or a tail gate. The camera may be disposed close to at least one of side windows inside the vehicle 10 in order to acquire side-view images of the vehicle 10. Alternatively, the camera may be disposed in the vicinity of a side mirror, a fender, or a door.

2.2) Radar

The radar may generate information about an object outside the vehicle 10 using electromagnetic waves. The radar may include an electromagnetic wave transmitter, an electromagnetic wave receiver, and at least one processor electrically connected to the electromagnetic wave transmitter and the electromagnetic wave receiver and configured to process a received signal and generate data about the object based on the processed signal. The radar may be a pulse radar or a continuous wave radar based on electromagnetic wave emission. The continuous wave radar may be a frequency modulated continuous wave (FMCW) radar or a frequency shift keying (FSK) radar based on signal waveforms. The radar may detect the object from the electromagnetic waves based on the time of flight (TOF) or phase shift principle and obtain the location of the detected object, the distance to the detected object, and the relative speed with respect to the detected object. The radar may be disposed at an appropriate position outside the vehicle 10 to detect objects placed in front, rear, or side of the vehicle 10.

2.3) Lidar

The lidar may generate information about an object outside the vehicle 10 using a laser beam. The lidar may include a light transmitter, a light receiver, and at least one processor electrically connected to the light transmitter and the light receiver and configured to process a received signal and generate data about the object based on the processed signal. The lidar may operate based on the TOF or phase shift principle. The lidar may be a driven type or a non-driven type. The driven type of lidar may be rotated by a motor and detect an object around the vehicle 10. The non-driven type of lidar may detect an object within a predetermined range from the vehicle 10 based on light steering. The vehicle 10 may include a plurality of non-driven type of lidars. The lidar may detect the object from the laser beam based on the TOF or phase shift principle and obtain the location of the detected object, the distance to the detected object, and the relative speed with respect to the detected object. The lidar may be disposed at an appropriate position outside the vehicle 10 to detect objects placed in front, rear, or side of the vehicle 10.

3) Communication Device

The communication device 220 may exchange a signal with a device outside the vehicle 10. The communication device 220 may exchange a signal with at least one of an infrastructure (e.g., server, broadcast station, etc.), another vehicle, and a terminal. The communication device 220 may include a transmission antenna, a reception antenna, and at least one of a radio frequency (RF) circuit and an RF element where various communication protocols may be implemented to perform communication.

For example, the communication device 220 may exchange a signal with an external device based on the cellular vehicle-to-everything (C-V2X) technology. The C-V2X technology may include LTE-based sidelink communication and/or NR-based sidelink communication. Details related to the C-V2X technology will be described later.

The communication device 220 may exchange the signal with the external device according to dedicated short-range communications (DSRC) technology or wireless access in vehicular environment (WAVE) standards based on IEEE 802.11p PHY/MAC layer technology and IEEE 1609 Network/Transport layer technology. The DSRC technology (or WAVE standards) is communication specifications for providing intelligent transport system (ITS) services through dedicated short-range communication between vehicle-mounted devices or between a road side unit and a vehicle-mounted device. The DSRC technology may be a communication scheme that allows the use of a frequency of 5.9 GHz and has a data transfer rate in the range of 3 Mbps to 27 Mbps. IEEE 802.11p may be combined with IEEE 1609 to support the DSRC technology (or WAVE standards).

According to the present disclosure, the communication device 220 may exchange the signal with the external device according to either the C-V2X technology or the DSRC technology. Alternatively, the communication device 220 may exchange the signal with the external device by combining the C-V2X technology and the DSRC technology.

4) Driving Operation Device

The driving operation device 230 is configured to receive a user input for driving. In a manual mode, the vehicle 10 may be driven based on a signal provided by the driving operation device 230. The driving operation device 230 may include a steering input device (e.g., steering wheel), an acceleration input device (e.g., acceleration pedal), and a brake input device (e.g., brake pedal).

5) Main ECU

The main ECU 240 may control the overall operation of at least one electronic device included in the vehicle 10.

6) Driving Control Device

The driving control device 250 is configured to electrically control various vehicle driving devices included in the vehicle 10. The driving control device 250 may include a power train driving control device, a chassis driving control device, a door/window driving control device, a safety driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety driving control device may include a seat belt driving control device for seat belt control.

The driving control device 250 includes at least one electronic control device (e.g., control ECU).

The driving control device 250 may control the vehicle driving device based on a signal received from the autonomous driving device 260. For example, the driving control device 250 may control a power train, a steering, and a brake based on signals received from the autonomous driving device 260.

7) Autonomous Driving Device

The autonomous driving device 260 may generate a route for autonomous driving based on obtained data. The autonomous driving device 260 may generate a driving plan for traveling along the generated route. The autonomous driving device 260 may generate a signal for controlling the movement of the vehicle 10 according to the driving plan. The autonomous driving device 260 may provide the generated signal to the driving control device 250.

The autonomous driving device 260 may implement at least one advanced driver assistance system (ADAS) function. The ADAS may implement at least one of adaptive cruise control (ACC), autonomous emergency braking (AEB), forward collision warning (FCW), lane keeping assist (LKA), lane change assist (LCA), target following assist (TFA), blind spot detection (BSD), high beam assist (HBA), auto parking system (APS), PD collision warning system, traffic sign recognition (TSR), traffic sign assist (TSA), night vision (NV), driver status monitoring (DSM), and traffic fam assist (TJA).

The autonomous driving device 260 may perform switching from an autonomous driving mode to a manual driving mode or switching from the manual driving mode to the autonomous driving mode. For example, the autonomous driving device 260 may switch the mode of the vehicle 10 from the autonomous driving mode to the manual driving mode or from the manual driving mode to the autonomous driving mode based on a signal received from the user interface device 200.

8) Sensing Unit

The sensing unit 270 may detect the state of the vehicle 10. The sensing unit 270 may include at least one of an inertial measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include at least one of an acceleration sensor, a gyro sensor, and a magnetic sensor.

The sensing unit 270 may generate data about the vehicle state based on a signal generated by at least one sensor. The vehicle state data may be information generated based on data detected by various sensors included in the vehicle 10. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data on pressure applied to the acceleration pedal, data on pressure applied to the brake pedal, etc.

9) Location Data Generating Device

The location data generating device 280 may generate data on the location of the vehicle 10. The location data generating device 280 may include at least one of a global positioning system (GPS) and a differential global positioning system (DGPS). The location data generating device 280 may generate the location data on the vehicle 10 based on a signal generated by at least one of the GPS and the DGPS. In some implementations, the location data generating device 280 may correct the location data based on at least one of the IMU sensor of the sensing unit 270 and the camera of the object detection device 210. The location data generating device 280 may also be called a global navigation satellite system (GNSS).

The vehicle 10 may include an internal communication system 50. The plurality of electronic devices included in the vehicle 10 may exchange a signal through the internal communication system 50. The signal may include data. The internal communication system 50 may use at least one communication protocol (e.g., CAN, LIN, FlexRay, MOST, or Ethernet).

(3) Components of Autonomous Driving Device

Figure 3:
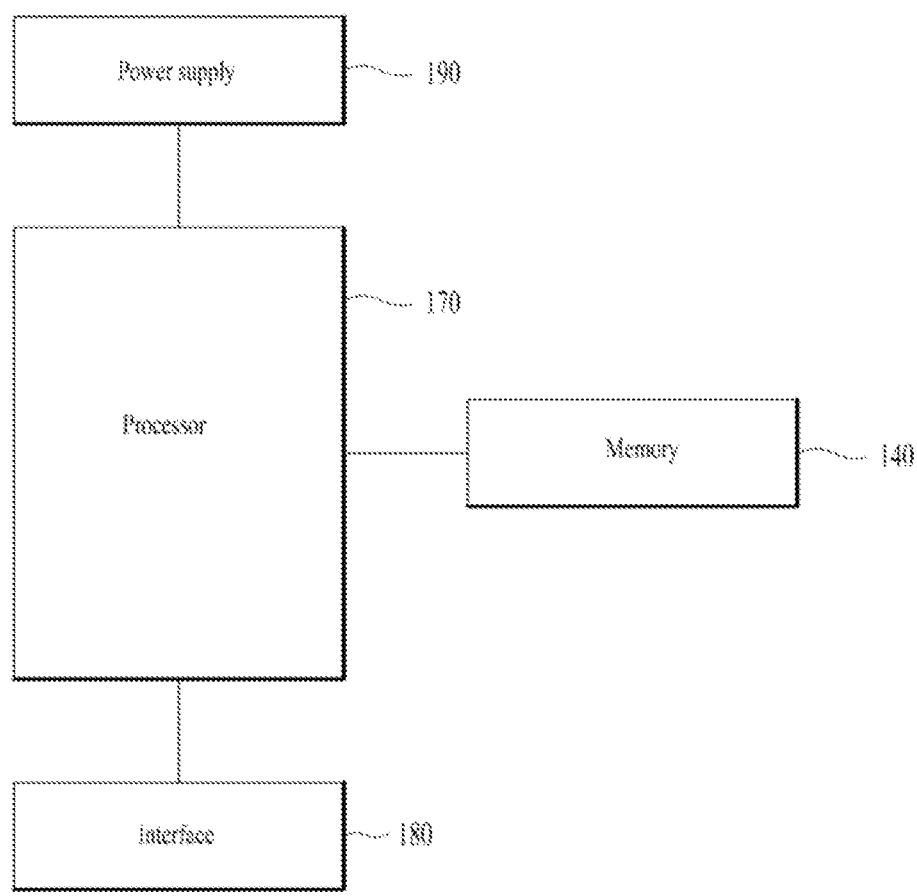
FIG. 3 is a control block view illustrating an autonomous driving device according to the embodiment of the present disclosure.

FIG. 3 is a control block diagram of the autonomous driving device 260 according to an implementation of the present disclosure.

Referring to FIG. 3, the autonomous driving device 260 may include a memory 140, a processor 170, an interface 180 and a power supply 190.

The memory 140 is electrically connected to the processor 170. The memory 140 may store basic data about a unit, control data for controlling the operation of the unit, and input/output data. The memory 140 may store data processed by the processor 170. In hardware implementation, the memory 140 may be implemented as any one of a ROM, a RAM, an EPROM, a flash drive, and a hard drive. The memory 140 may store various data for the overall operation of the autonomous driving device 260, such as a program for processing or controlling the processor 170. The memory 140 may be integrated with the processor 170. In some implementations, the memory 140 may be classified as a subcomponent of the processor 170.

The interface 180 may exchange a signal with at least one electronic device included in the vehicle 10 by wire or wirelessly. The interface 180 may exchange a signal with at least one of the object detection device 210, the communication device 220, the driving operation device 230, the main ECU 240, the driving control device 250, the sensing unit 270, and the location data generating device 280 by wire or wirelessly. The interface 180 may be implemented with at least one of a communication module, a terminal, a pin, a cable, a port, a circuit, an element, and a device.

The power supply 190 may provide power to the autonomous driving device 260. The power supply 190 may be provided with power from a power source (e.g., battery) included in the vehicle 10 and supply the power to each unit of the autonomous driving device 260. The power supply 190 may operate according to a control signal from the main ECU 240. The power supply 190 may include a switched-mode power supply (SMPS).

The processor 170 may be electrically connected to the memory 140, the interface 180, and the power supply 190 to exchange signals with the components. The processor 170 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may be driven by power supplied from the power supply 190. The processor 170 may receive data, process the data, generate a signal, and provide the signal while the power is supplied thereto.

The processor 170 may receive information from other electronic devices included in the vehicle 10 through the interface 180. The processor 170 may provide a control signal to other electronic devices in the vehicle 10 through the interface 180.

The autonomous driving device 260 may include at least one printed circuit board (PCB). The memory 140, the interface 180, the power supply 190, and the processor 170 may be electrically connected to the PCB.

(4) Operation of Autonomous Driving Device

1) Receiving Operation

Figure 4:
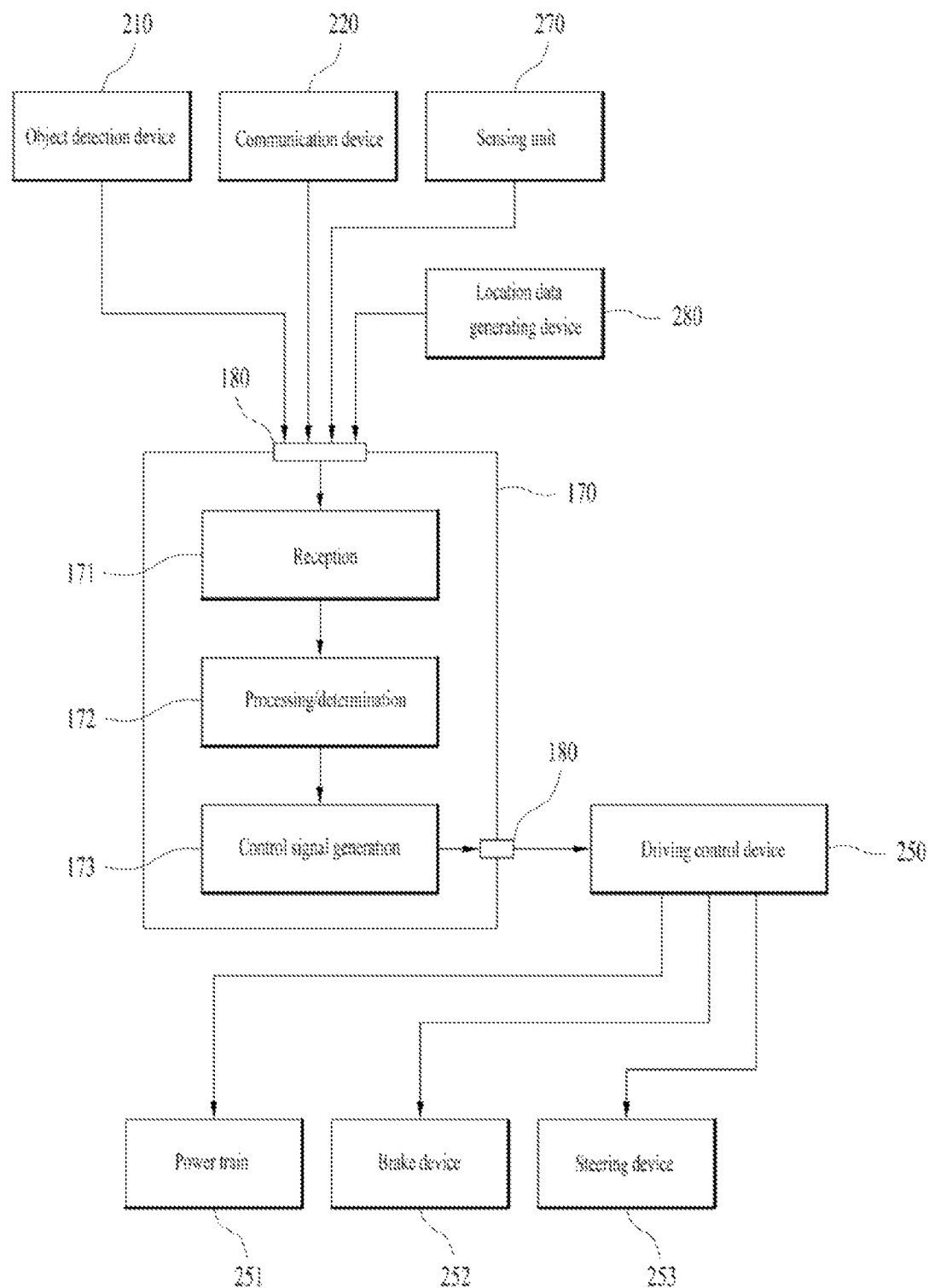
FIG. 4 is a block view illustrating an autonomous driving device according to the embodiment of the present disclosure.

Referring to FIG. 4, the processor 170 may perform a receiving operation. The processor 170 may receive data from at least one of the object detection device 210, the communication device 220, the sensing unit 270, and the location data generating device 280 through the interface 180. The processor 170 may receive object data from the object detection device 210. The processor 170 may receive HD map data from the communication device 220. The processor 170 may receive vehicle state data from the sensing unit 270. The processor 170 may receive location data from the location data generating device 280.

2) Processing/Determination Operation

The processor 170 may perform a processing/determination operation. The processor 170 may perform the processing/determination operation based on driving state information. The processor 170 may perform the processing/determination operation based on at least one of object data, HD map data, vehicle state data, and location data.

2.1) Driving Plan Data Generating Operation

The processor 170 may generate driving plan data. For example, the processor 170 may generate electronic horizon data. The electronic horizon data may be understood as driving plan data from the current location of the vehicle 10 to the horizon. The horizon may be understood as a point away from the current location of the vehicle 10 by a predetermined distance along a predetermined traveling route. Further, the horizon may refer to a point at which the vehicle 10 may arrive after a predetermined time from the current location of the vehicle 10 along the predetermined traveling route.

The electronic horizon data may include horizon map data and horizon path data.

2.1.1) Horizon Map Data

The horizon map data may include at least one of topology data, road data, HD map data and dynamic data. In some implementations, the horizon map data may include a plurality of layers. For example, the horizon map data may include a first layer matching with the topology data, a second layer matching with the road data, a third layer matching with the HD map data, and a fourth layer matching with the dynamic data. The horizon map data may further include static object data.

The topology data may be understood as a map created by connecting road centers with each other. The topology data is suitable for representing an approximate location of a vehicle and may have a data form used for navigation for drivers. The topology data may be interpreted as data about roads without vehicles. The topology data may be generated on the basis of data received from an external server through the communication device 220. The topology data may be based on data stored in at least one memory included in the vehicle 10.

The road data may include at least one of road slope data, road curvature data, and road speed limit data. The road data may further include no-passing zone data. The road data may be based on data received from an external server through the communication device 220. The road data may be based on data generated by the object detection device 210.

The HD map data may include detailed topology information including road lanes, connection information about each lane, and feature information for vehicle localization (e.g., traffic sign, lane marking/property, road furniture, etc.). The HD map data may be based on data received from an external server through the communication device 220.

The dynamic data may include various types of dynamic information on roads. For example, the dynamic data may include construction information, variable speed road information, road condition information, traffic information, moving object information, etc. The dynamic data may be based on data received from an external server through the communication device 220. The dynamic data may be based on data generated by the object detection device 210.

The processor 170 may provide map data from the current location of the vehicle 10 to the horizon.

2.1.2) Horizon Path Data

The horizon path data may be understood as a potential trajectory of the vehicle 10 when the vehicle 10 travels from the current location of the vehicle 10 to the horizon. The horizon path data may include data indicating the relative probability of selecting a road at the decision point (e.g., fork, junction, crossroad, etc.). The relative probability may be calculated on the basis of the time taken to arrive at the final destination. For example, if the time taken to arrive at the final destination when a first road is selected at the decision point is shorter than that when a second road is selected, the probability of selecting the first road may be calculated to be higher than the probability of selecting the second road.

The horizon path data may include a main path and a sub-path. The main path may be understood as a trajectory obtained by connecting roads that are highly likely to be selected. The sub-path may be branched from at least one decision point on the main path. The sub-path may be understood as a trajectory obtained by connecting one or more roads that are less likely to be selected at the at least one decision point on the main path.

3) Control Signal Generating Operation

The processor 170 may perform a control signal generating operation. The processor 170 may generate a control signal on the basis of the electronic horizon data. For example, the processor 170 may generate at least one of a power train control signal, a brake device control signal, and a steering device control signal on the basis of the electronic horizon data.

The processor 170 may transmit the generated control signal to the driving control device 250 through the interface 180. The driving control device 250 may forward the control signal to at least one of a power train 251, a brake device 252 and a steering device 253.

2. Cabin

Figure 5:
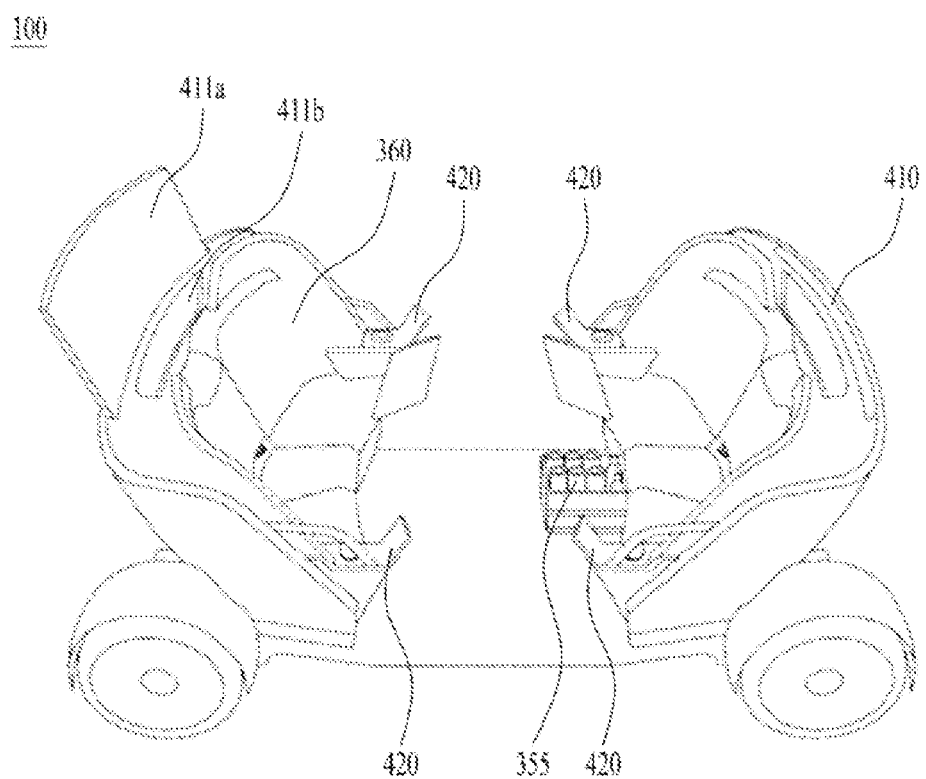
FIG. 5 is a view illustrating the inside of a vehicle according to the embodiment of the present disclosure.

FIG. 5 is a diagram showing the interior of the vehicle 10 according to an implementation of the present disclosure.

Figure 6:
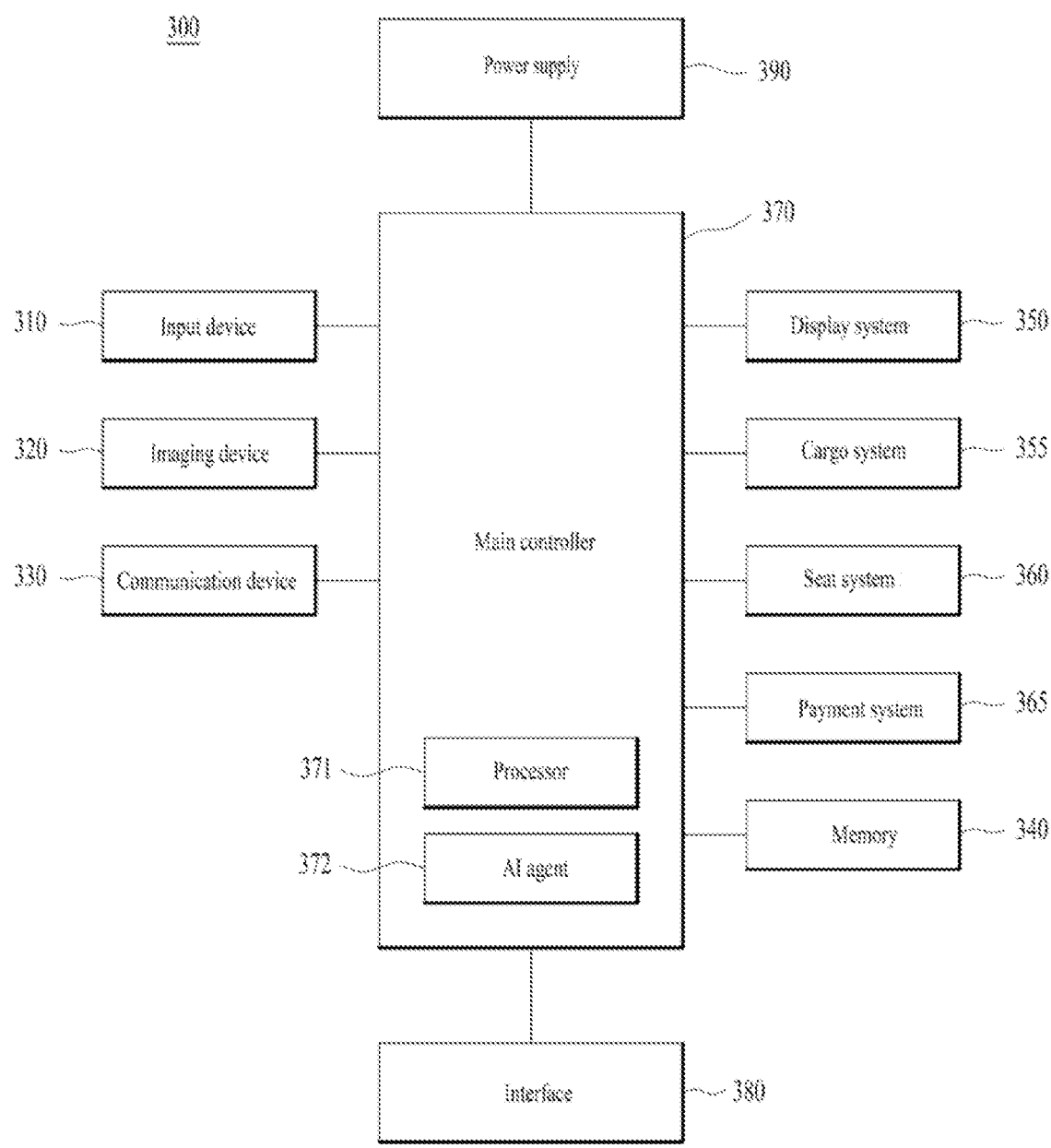
FIG. 6 is a block view illustrating a cabin system for a vehicle according to the embodiment of the present disclosure.

FIG. 6 is a block diagram for explaining a vehicle cabin system according to an implementation of the present disclosure.

Referring to FIGS. 5 and 6, a vehicle cabin system 300 (cabin system) may be defined as a convenience system for the user who uses the vehicle 10. The cabin system 300 may be understood as a high-end system including a display system 350, a cargo system 355, a seat system 360, and a payment system 365. The cabin system 300 may include a main controller 370, a memory 340, an interface 380, a power supply 390, an input device 310, an imaging device 320, a communication device 330, the display system 350, the cargo system 355, the seat system 360, and the payment system 365. In some implementations, the cabin system 300 may further include components in addition to the components described in this specification or may not include some of the components described in this specification.

1) Main Controller

The main controller 370 may be electrically connected to the input device 310, the communication device 330, the display system 350, the cargo system 355, the seat system 360, and the payment system 365 and exchange signals with the components. The main controller 370 may control the input device 310, the communication device 330, the display system 350, the cargo system 355, the seat system 360, and the payment system 365. The main controller 370 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may include at least one sub-controller. In some implementations, the main controller 370 may include a plurality of sub-controllers. The plurality of sub-controllers may control the devices and systems included in the cabin system 300, respectively. The devices and systems included in the cabin system 300 may be grouped by functions or grouped with respect to seats for users.

The main controller 370 may include at least one processor 371. Although FIG. 6 illustrates the main controller 370 including a single processor 371, the main controller 371 may include a plurality of processors 371. The processor 371 may be classified as one of the above-described sub-controllers.

The processor 371 may receive signals, information, or data from a user terminal through the communication device 330. The user terminal may transmit signals, information, or data to the cabin system 300.

The processor 371 may identify the user on the basis of image data received from at least one of an internal camera and an external camera included in the imaging device 320. The processor 371 may identify the user by applying an image processing algorithm to the image data. For example, the processor 371 may identify the user by comparing information received from the user terminal with the image data. For example, the information may include information about at least one of the route, body, fellow passenger, baggage, location, preferred content, preferred food, disability, and use history of the user.

The main controller 370 may include an artificial intelligence agent 372. The artificial intelligence agent 372 may perform machine learning on the basis of data acquired from the input device 310. The artificial intelligence agent 372 may control at least one of the display system 350, the cargo system 355, the seat system 360, and the payment system 365 on the basis of machine learning results.

2) Essential Components

The memory 340 is electrically connected to the main controller 370. The memory 340 may store basic data about a unit, control data for controlling the operation of the unit, and input/output data. The memory 340 may store data processed by the main controller 370. In hardware implementation, the memory 140 may be implemented as any one of a ROM, a RAM, an EPROM, a flash drive, and a hard drive. The memory 340 may store various types of data for the overall operation of the cabin system 300, such as a program for processing or controlling the main controller 370. The memory 340 may be integrated with the main controller 370.

The interface 380 may exchange a signal with at least one electronic device included in the vehicle 10 by wire or wirelessly. The interface 380 may be implemented with at least one of a communication module, a terminal, a pin, a cable, a port, a circuit, an element and a device.

The power supply 390 may provide power to the cabin system 300. The power supply 390 may be provided with power from a power source (e.g., battery) included in the vehicle 10 and supply the power to each unit of the cabin system 300. The power supply 390 may operate according to a control signal from the main controller 370. For example, the power supply 390 may be implemented as a SMPS.

The cabin system 300 may include at least one PCB. The main controller 370, the memory 340, the interface 380, and the power supply 390 may be mounted on at least one PCB.

3) Input Device

The input device 310 may receive a user input. The input device 310 may convert the user input into an electrical signal. The electrical signal converted by the input device 310 may be converted into a control signal and provided to at least one of the display system 350, the cargo system 355, the seat system 360, and the payment system 365. The main controller 370 or at least one processor included in the cabin system 300 may generate a control signal based on an electrical signal received from the input device 310.

The input device 310 may include at least one of a touch input unit, a gesture input unit, a mechanical input unit, and a voice input unit. The touch input unit may convert a touch input from the user into an electrical signal. The touch input unit may include at least one touch sensor to detect the user's touch input. In some implementations, the touch input unit may be implemented as a touch screen by integrating the touch input unit with at least one display included in the display system 350. Such a touch screen may provide both an input interface and an output interface between the cabin system 300 and the user. The gesture input unit may convert a gesture input from the user into an electrical signal. The gesture input unit may include at least one of an infrared sensor and an image sensor to detect the user's gesture input. In some implementations, the gesture input unit may detect a three-dimensional gesture input from the user. To this end, the gesture input unit may include a plurality of light output units for outputting infrared light or a plurality of image sensors. The gesture input unit may detect the user's three-dimensional gesture input based on the TOF, structured light, or disparity principle. The mechanical input unit may convert a physical input (e.g., press or rotation) from the user through a mechanical device into an electrical signal. The mechanical input unit may include at least one of a button, a dome switch, a jog wheel, and a jog switch. Meanwhile, the gesture input unit and the mechanical input unit may be integrated. For example, the input device 310 may include a jog dial device that includes a gesture sensor and is formed such that jog dial device may be inserted/ejected into/from a part of a surrounding structure (e.g., at least one of a seat, an armrest, and a door). When the jog dial device is parallel to the surrounding structure, the jog dial device may serve as the gesture input unit. When the jog dial device protrudes from the surrounding structure, the jog dial device may serve as the mechanical input unit. The voice input unit may convert a user's voice input into an electrical signal. The voice input unit may include at least one microphone. The voice input unit may include a beamforming MIC.

4) Imaging Device

The imaging device 320 may include at least one camera. The imaging device 320 may include at least one of an internal camera and an external camera. The internal camera may capture an image of the inside of the cabin. The external camera may capture an image of the outside of the vehicle 10. The internal camera may obtain the image of the inside of the cabin. The imaging device 320 may include at least one internal camera. It is desirable that the imaging device 320 includes as many cameras as the maximum number of passengers in the vehicle 10. The imaging device 320 may provide an image obtained by the internal camera. The main controller 370 or at least one processor included in the cabin system 300 may detect the motion of the user from the image acquired by the internal camera, generate a signal on the basis of the detected motion, and provide the signal to at least one of the display system 350, the cargo system 355, the seat system 360, and the payment system 365. The external camera may obtain the image of the outside of the vehicle 10. The imaging device 320 may include at least one external camera. It is desirable that the imaging device 320 include as many cameras as the maximum number of passenger doors. The imaging device 320 may provide an image obtained by the external camera. The main controller 370 or at least one processor included in the cabin system 300 may acquire user information from the image acquired by the external camera. The main controller 370 or at least one processor included in the cabin system 300 may authenticate the user or obtain information about the user body (e.g., height, weight, etc.), information about fellow passengers, and information about baggage from the user information.

5) Communication Device

The communication device 330 may exchange a signal with an external device wirelessly. The communication device 330 may exchange the signal with the external device through a network or directly. The external device may include at least one of a server, a mobile terminal, and another vehicle. The communication device 330 may exchange a signal with at least one user terminal. To perform communication, the communication device 330 may include an antenna and at least one of an RF circuit and element capable of at least one communication protocol. In some implementations, the communication device 330 may use a plurality of communication protocols. The communication device 330 may switch the communication protocol based on the distance to a mobile terminal.

For example, the communication device 330 may exchange the signal with the external device based on the C-V2X technology. The C-V2X technology may include LTE-based sidelink communication and/or NR-based sidelink communication. Details related to the C-V2X technology will be described later.

The communication device 220 may exchange the signal with the external device according to DSRC technology or WAVE standards based on IEEE 802.11p PHY/MAC layer technology and IEEE 1609 Network/Transport layer technology. The DSRC technology (or WAVE standards) is communication specifications for providing ITS services through dedicated short-range communication between vehicle-mounted devices or between a road side unit and a vehicle-mounted device. The DSRC technology may be a communication scheme that allows the use of a frequency of 5.9 GHz and has a data transfer rate in the range of 3 Mbps to 27 Mbps. IEEE 802.11p may be combined with IEEE 1609 to support the DSRC technology (or WAVE standards).

According to the present disclosure, the communication device 330 may exchange the signal with the external device according to either the C-V2X technology or the DSRC technology. Alternatively, the communication device 330 may exchange the signal with the external device by combining the C-V2X technology and the DSRC technology.

6) Display System

The display system 350 may display a graphic object. The display system 350 may include at least one display device. For example, the display system 350 may include a first display device 410 for common use and a second display device 420 for individual use.

6.1) Common Display Device

The first display device 410 may include at least one display 411 to display visual content. The display 411 included in the first display device 410 may be implemented with at least one of a flat display, a curved display, a rollable display, and a flexible display. For example, the first display device 410 may include a first display 411 disposed behind a seat and configured to be inserted/ejected into/from the cabin, and a first mechanism for moving the first display 411. The first display 411 may be disposed such that the first display 411 is capable of being inserted/ejected into/from a slot formed in a seat main frame. In some implementations, the first display device 410 may further include a mechanism for controlling a flexible part. The first display 411 may be formed to be flexible, and a flexible part of the first display 411 may be adjusted based on the position of the user. For example, the first display device 410 may be disposed on the ceiling of the cabin and include a second display formed to be rollable and a second mechanism for rolling and releasing the second display. The second display may be formed such that images may be displayed on both sides thereof. For example, the first display device 410 may be disposed on the ceiling of the cabin and include a third display formed to be flexible and a third mechanism for bending and unbending the third display. In some implementations, the display system 350 may further include at least one processor that provides a control signal to at least one of the first display device 410 and the second display device 420. The processor included in the display system 350 may generate a control signal based on a signal received from at last one of the main controller 370, the input device 310, the imaging device 320, and the communication device 330.

The display area of a display included in the first display device 410 may be divided into a first area 411a and a second area 411b. The first area 411a may be defined as a content display area. For example, at least one of graphic objects corresponding to display entertainment content (e.g., movies, sports, shopping, food, etc.), video conferences, food menus, and augmented reality images may be displayed in the first area 411. Further, a graphic object corresponding to driving state information about the vehicle 10 may be displayed in the first area 411a. The driving state information may include at least one of information about an object outside the vehicle 10, navigation information, and vehicle state information. The object information may include at least one of information about the presence of the object, information about the location of the object, information about the distance between the vehicle 10 and the object, and information about the relative speed of the vehicle 10 with respect to the object. The navigation information may include at least one of map information, information about a set destination, information about a route to the destination, information about various objects on the route, lane information, and information on the current location of the vehicle 10. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle internal temperature information, vehicle internal humidity information, pedal position information, vehicle engine temperature information, etc. The second area 411b may be defined as a user interface area. For example, an artificial intelligence agent screen may be displayed in the second area 411b. In some implementations, the second area 411b may be located in an area defined for a seat frame. In this case, the user may view content displayed in the second area 411b between seats. In some implementations, the first display device 410 may provide hologram content. For example, the first display device 410 may provide hologram content for each of a plurality of users so that only a user who requests the content may view the content.

6.2) Display Device for Individual Use

The second display device 420 may include at least one display 421. The second display device 420 may provide the display 421 at a position at which only each passenger may view display content. For example, the display 421 may be disposed on the armrest of the seat. The second display device 420 may display a graphic object corresponding to personal information about the user. The second display device 420 may include as many displays 421 as the maximum number of passengers in the vehicle 10. The second display device 420 may be layered or integrated with a touch sensor to implement a touch screen. The second display device 420 may display a graphic object for receiving a user input for seat adjustment or indoor temperature adjustment.

7) Cargo System

The cargo system 355 may provide items to the user according to the request from the user. The cargo system 355 may operate on the basis of an electrical signal generated by the input device 310 or the communication device 330. The cargo system 355 may include a cargo box. The cargo box may include the items and be hidden under the seat. When an electrical signal based on a user input is received, the cargo box may be exposed to the cabin. The user may select a necessary item from the items loaded in the cargo box. The cargo system 355 may include a sliding mechanism and an item pop-up mechanism to expose the cargo box according to the user input. The cargo system 355 may include a plurality of cargo boxes to provide various types of items. A weight sensor for determining whether each item is provided may be installed in the cargo box.

8) Seat System

The seat system 360 may customize the seat for the user. The seat system 360 may operate on the basis of an electrical signal generated by the input device 310 or the communication device 330. The seat system 360 may adjust at least one element of the seat by obtaining user body data. The seat system 360 may include a user detection sensor (e.g., pressure sensor) to determine whether the user sits on the seat. The seat system 360 may include a plurality of seats for a plurality of users. One of the plurality of seats may be disposed to face at least another seat. At least two users may sit while facing each other inside the cabin.

9) Payment System

The payment system 365 may provide a payment service to the user. The payment system 365 may operate on the basis of an electrical signal generated by the input device 310 or the communication device 330. The payment system 365 may calculate the price of at least one service used by the user and request the user to pay the calculated price.

3. C-V2X

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink refers to a communication scheme in which a direct link is established between user equipments (UEs) and the UEs directly exchange voice or data without intervention of a base station (BS). The sidelink is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). $3^{rd}$ generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, $5^{th}$ generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of the present disclosure is not limited thereto.

Figure 7:
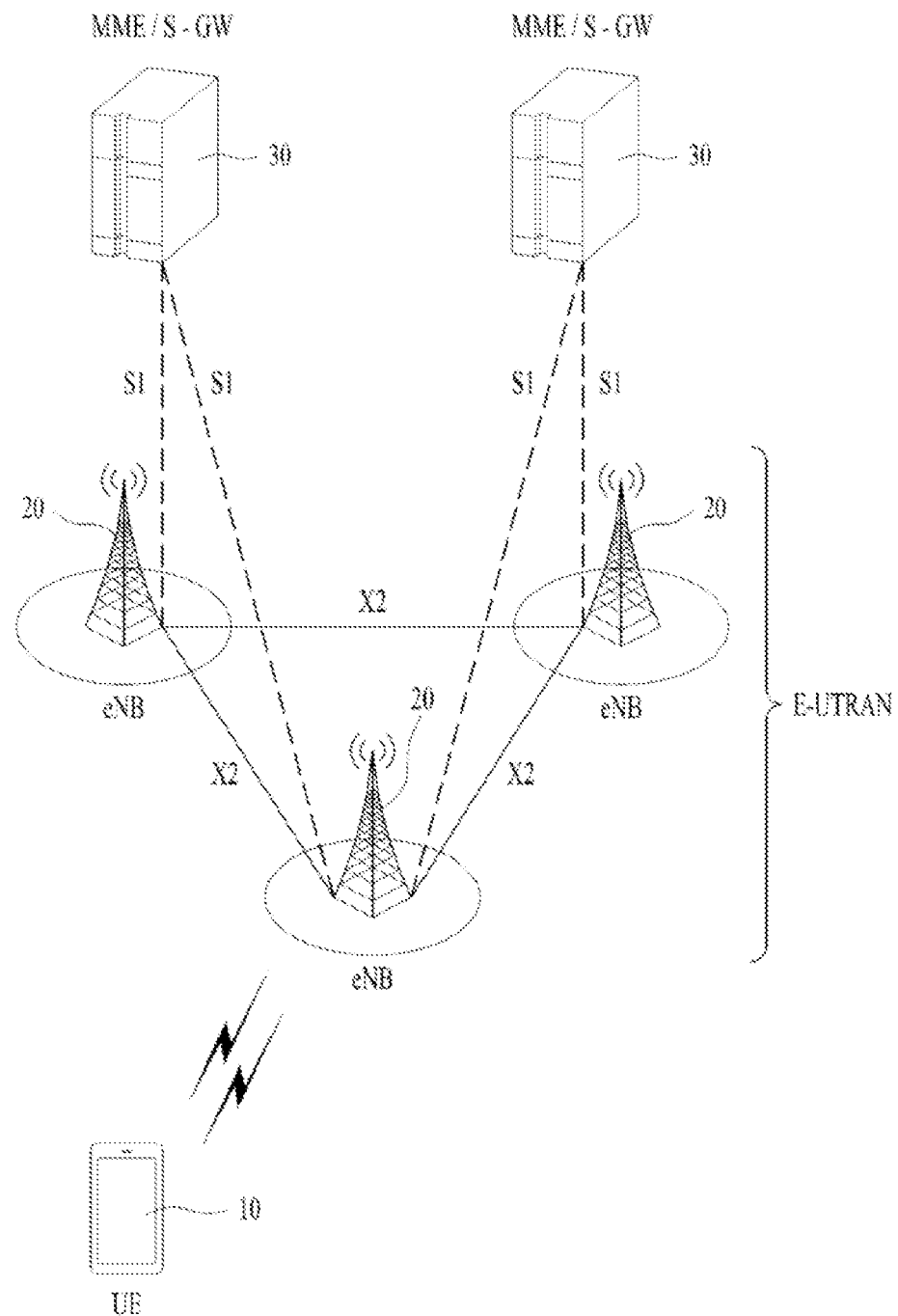
FIG. 7 illustrates a structure of an LTE system to which the present disclosure is applicable.

FIG. 7 illustrates the structure of an LTE system to which the present disclosure is applicable. This may also be called an evolved UMTS terrestrial radio access network (E-UTRAN) or LTE/LTE-A system.

Referring to FIG. 7, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 8:
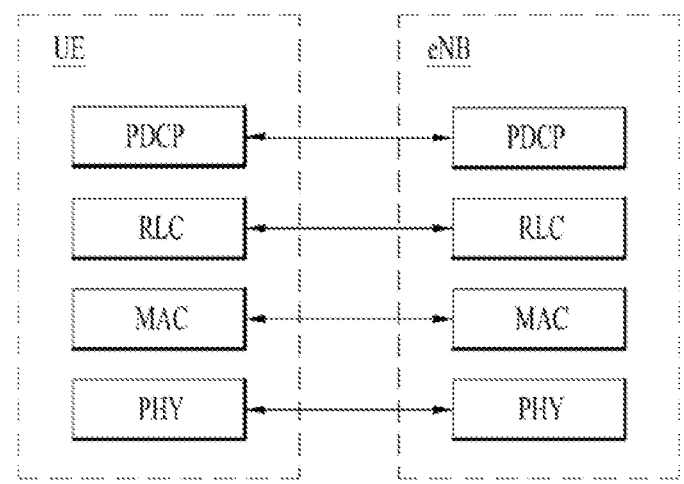
FIG. 8 illustrates a radio protocol architecture for a user plane to which the present disclosure is applicable.

FIG. 8 illustrates a user-plane radio protocol architecture to which the present disclosure is applicable.

Figure 9:
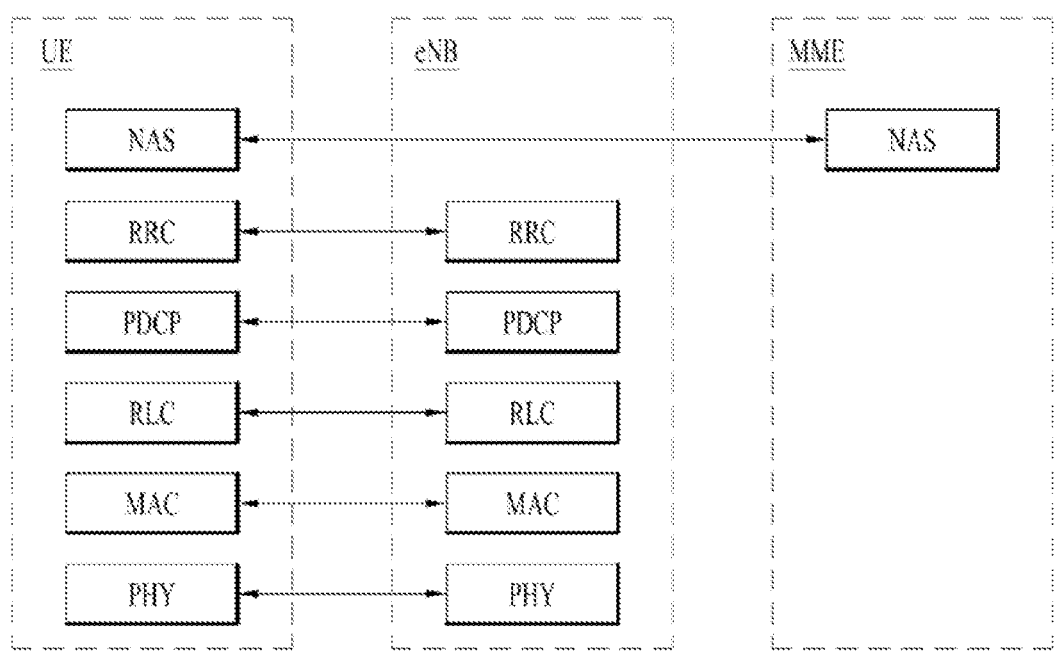
FIG. 9 illustrates a radio protocol architecture for a control plane to which the present disclosure is applicable.

FIG. 9 illustrates a control-plane radio protocol architecture to which the present disclosure is applicable. A user plane is a protocol stack for user data transmission, and a control plane is a protocol stack for control signal transmission.

Referring to FIGS. 8 and 9, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 10:
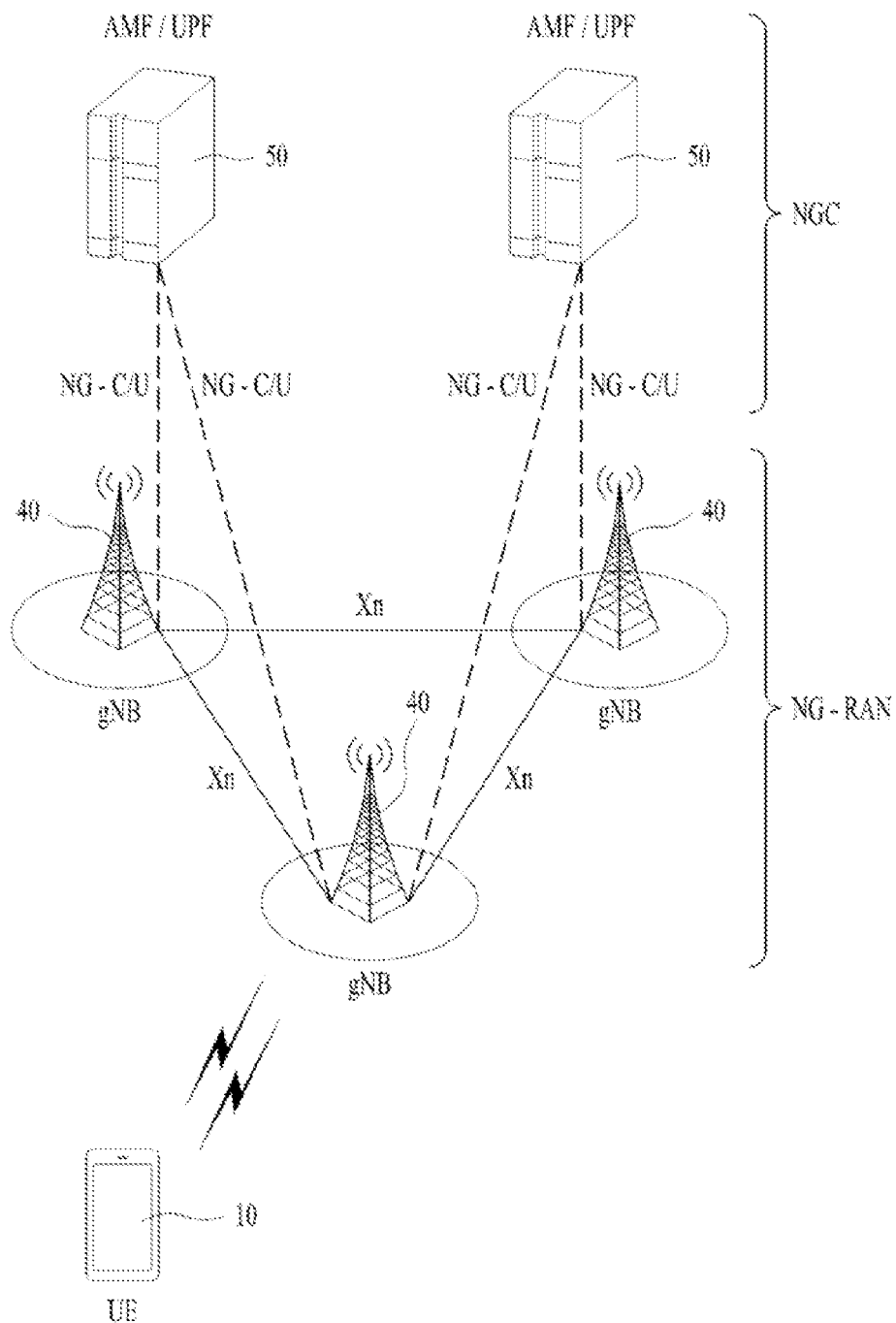
FIG. 10 illustrates a structure of an NR system to which the present disclosure is applicable.

FIG. 10 illustrates the structure of a NR system to which the present disclosure is applicable.

Referring to FIG. 10, a next generation radio access network (NG-RAN) may include a next generation Node B (gNB) and/or an eNB, which provides user-plane and control-plane protocol termination to a UE. In FIG. 10, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 11:
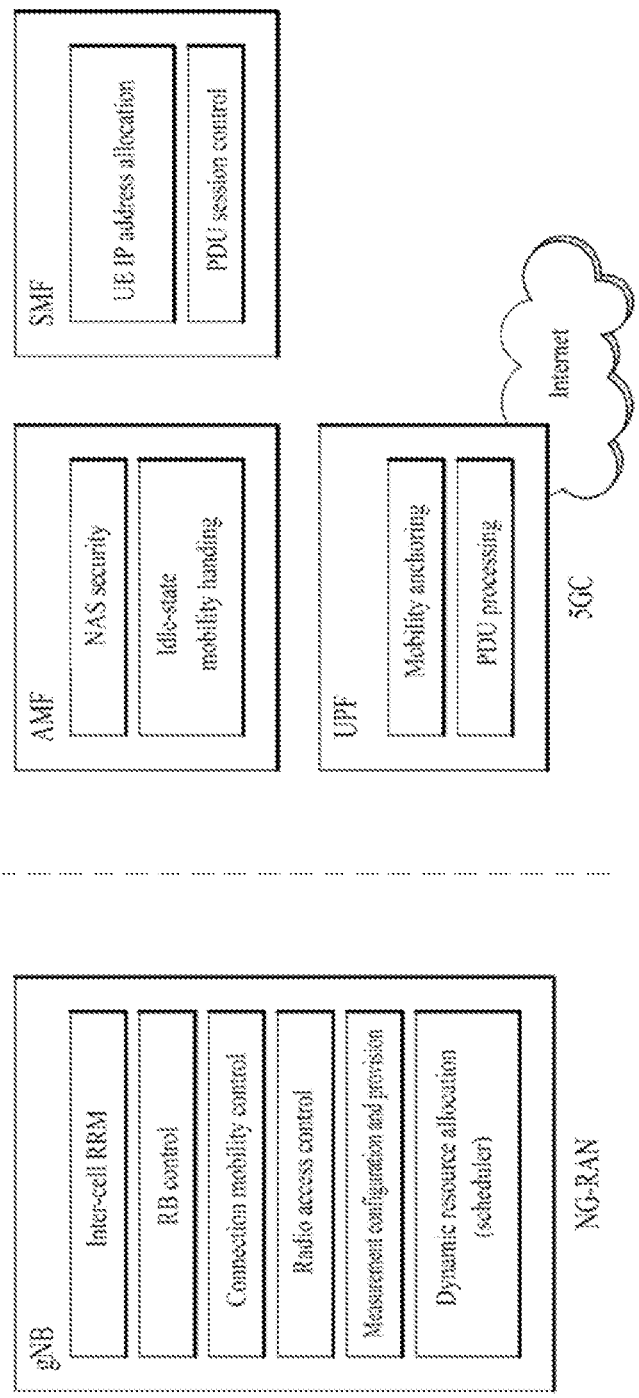
FIG. 11 illustrates functional division between NG-RAN and 5GC to which the present disclosure is applicable.

FIG. 11 illustrates functional split between the NG-RAN and the 5GC to which the present disclosure is applicable.

Referring to FIG. 11, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 12:
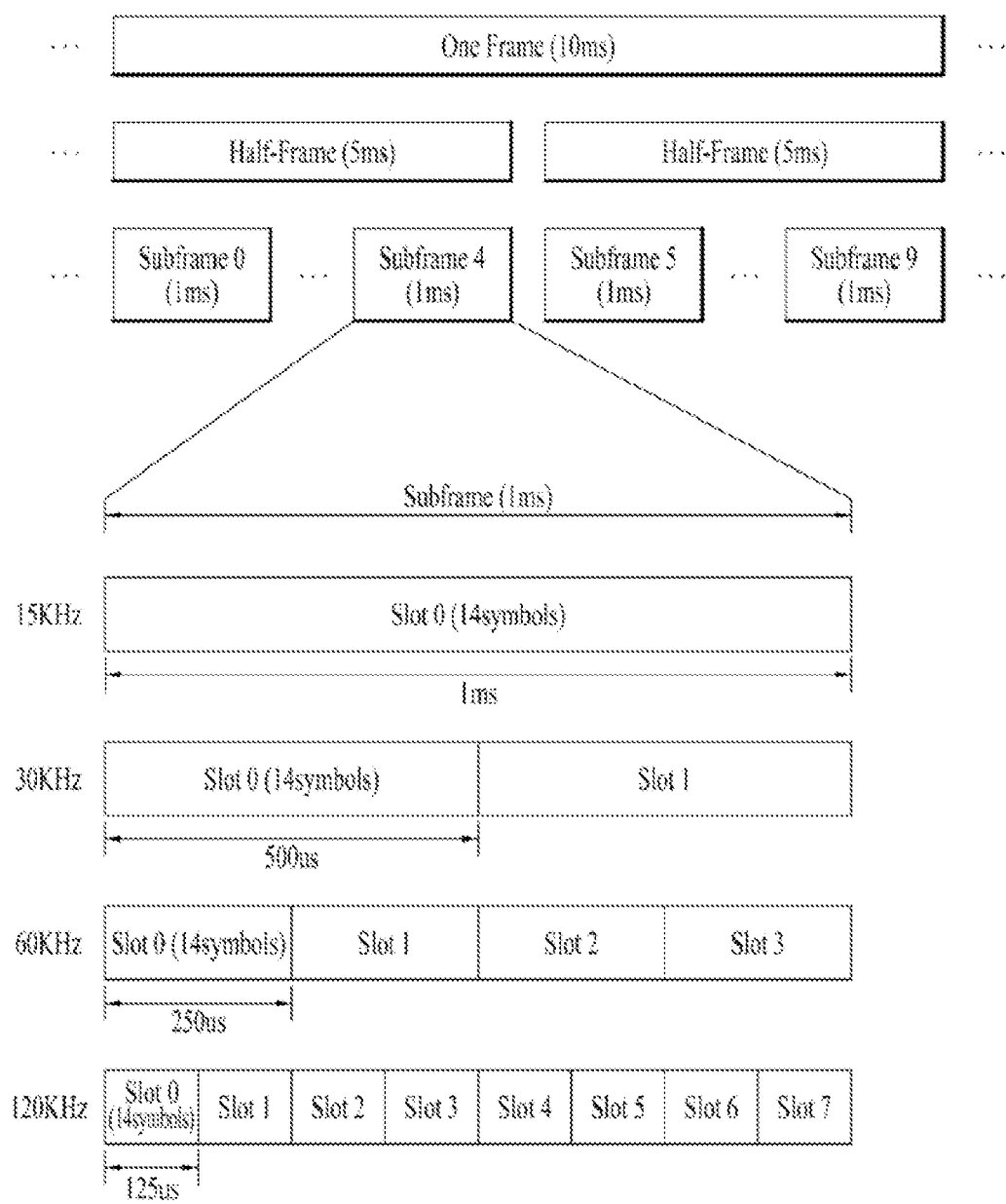
FIG. 12 illustrates a structure of a radio frame of an NR system to which the present disclosure is applicable.

FIG. 12 illustrates the structure of a NR radio frame to which the present disclosure is applicable.

Referring to FIG. 12, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

Figure 13:
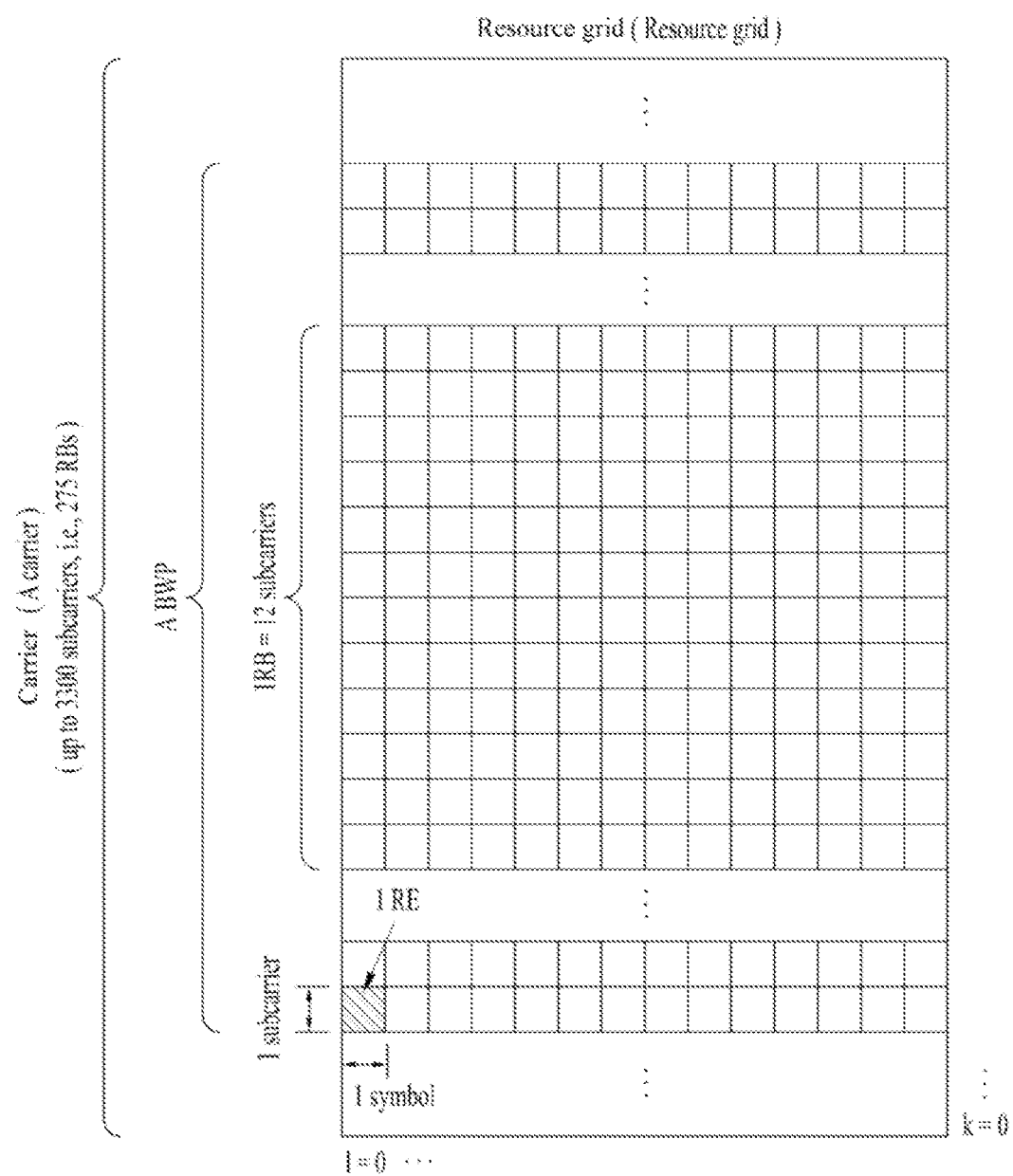
FIG. 13 illustrates a structure of a slot of an NR frame to which the present disclosure is applicable.

FIG. 13 illustrates the slot structure of a NR frame to which the present disclosure is applicable.

Referring to FIG. 13, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element is referred to as a resource element (RE), and one complex symbol may be mapped thereto.

Figure 14:
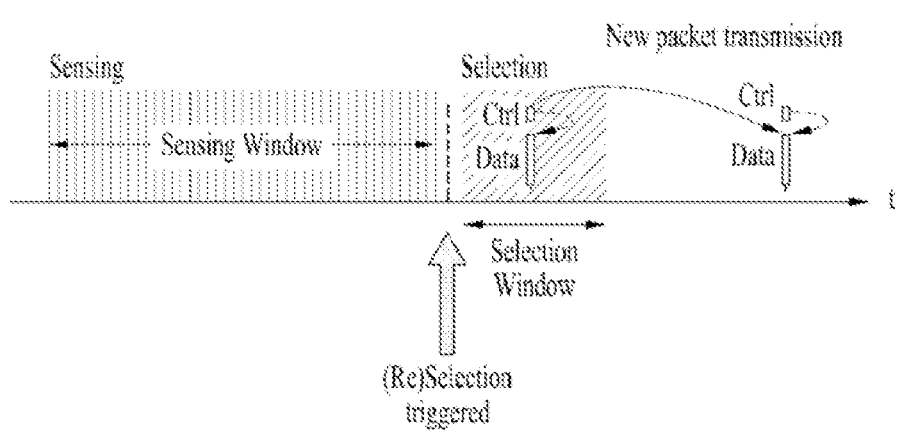
FIG. 14 illustrates an example of a reservation method of transmission resources of next packet in transmission resource selection.

As shown in FIG. 14, when transmission resources are selected, the transmission resource for a next packet may also be reserved.

FIG. 14 illustrates an example of transmission resource selection to which the present disclosure is applicable.

In V2X communication, transmission may be performed twice for each MAC PDU. For example, referring to FIG. 14, when resources for initial transmission are selected, resources for retransmission may also be reserved apart from the resources for initial transmission by a predetermined time gap. A UE may identify transmission resources reserved or used by other UEs through sensing in a sensing window, exclude the transmission resources from a selection window, and randomly select resources with less interference from among the remaining resources.

For example, the UE may decode a physical sidelink control channel (PSCCH) including information about the cycle of reserved resources within the sensing window and measure physical sidelink shared channel (PSSCH) reference signal received power (RSRP) on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference (for example, the bottom 20 percent). After selecting resources included in the selection window from among the periodic resources, the UE may randomly select sidelink resources from among the resources included in the selection window. For example, when the UE fails to decode the PSCCH, the UE may apply the above-described method.

Figure 15:
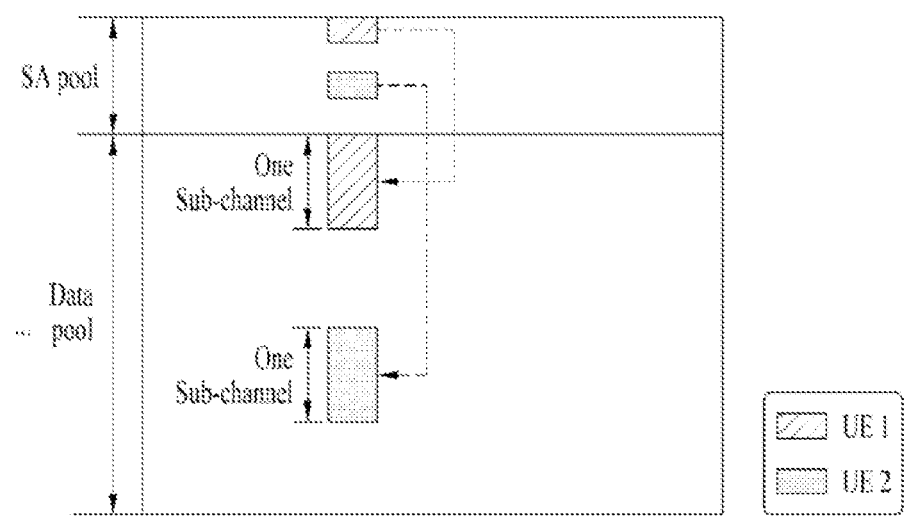
FIG. 15 illustrates an example that PSCCH is transmitted in a sidelink transmission mode 3 or 4 to which the present disclosure is applicable.
Figure 15:
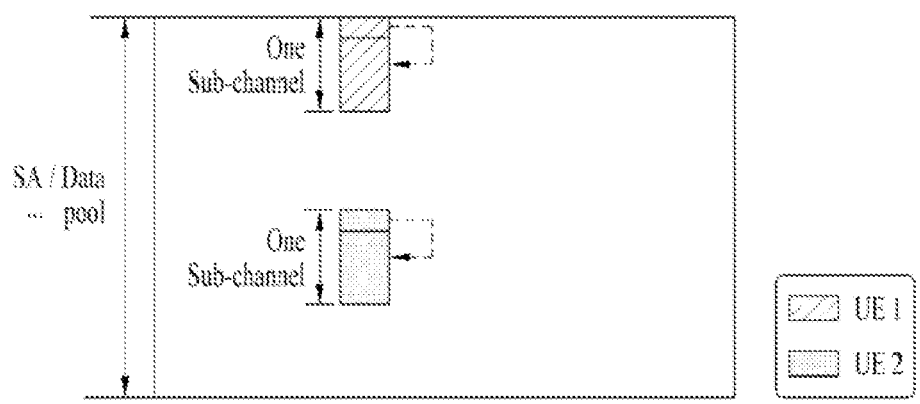

FIG. 15 illustrates an example of PSCCH transmission in sidelink transmission mode 3 or 4 to which the present disclosure is applicable.

In V2X communication, that is, in sidelink transmission mode 3 or 4, a PSCCH and a PSSCH are frequency division multiplexed (FDM) and transmitted, unlike sidelink communication. Since latency reduction is important in V2X in consideration of the nature of vehicle communication, the PSCCH and PSSCH are FDM and transmitted on the same time resources but different frequency resources. Referring to FIG. 15, the PSCCH and PSSCH may not be contiguous to each other as illustrated in FIG. 15 (a) or may be contiguous to each other as illustrated in FIG. 15 (b). A subchannel is used as a basic transmission unit. The subchannel may be a resource unit including one or more RBs in the frequency domain within a predetermined time resource (e.g., time resource unit). The number of RBs included in the subchannel (i.e., the size of the subchannel and the starting position of the subchannel in the frequency domain) may be indicated by higher layer signaling. The example of FIG. 15 may be applied to NR sidelink resource allocation mode 1 or 2.

Hereinafter, a cooperative awareness message (CAM) and a decentralized environmental notification message (DENM) will be described.

In V2V communication, a periodic message type of CAM and an event-triggered type of DENM may be transmitted. The CAM may include dynamic state information about a vehicle such as direction and speed, vehicle static data such as dimensions, and basic vehicle information such as ambient illumination states, path details, etc. The CAM may be 50 to 300 bytes long. In addition, the CAM is broadcast, and the latency thereof should be less than 100 ms. The DENM may be generated upon the occurrence of an unexpected incident such as a breakdown, an accident, etc. The DENM may be shorter than 3000 bytes, and it may be received by all vehicles within the transmission range thereof. The DENM may be prioritized over the CAM.

Hereinafter, carrier reselection will be described.

The carrier reselection for V2X/sidelink communication may be performed by MAC layers based on the channel busy ratio (CBR) of configured carriers and the ProSe per-packet priority (PPPP) of a V2X message to be transmitted.

The CBR may refer to a portion of sub-channels in a resource pool where S-RSSI measured by the UE is greater than a preconfigured threshold. There may be a PPPP related to each logical channel, and latency required by both the UE and BS needs to be reflected when the PPPP is configured. In the carrier reselection, the UE may select at least one carrier among candidate carriers in ascending order from the lowest CBR.

Hereinafter, physical layer processing will be described.

A transmitting side may perform the physical layer processing on a data unit to which the present disclosure is applicable before transmitting the data unit over an air interface, and a receiving side may perform the physical layer processing on a radio signal carrying the data unit to which the present disclosure is applicable.

Figure 16:
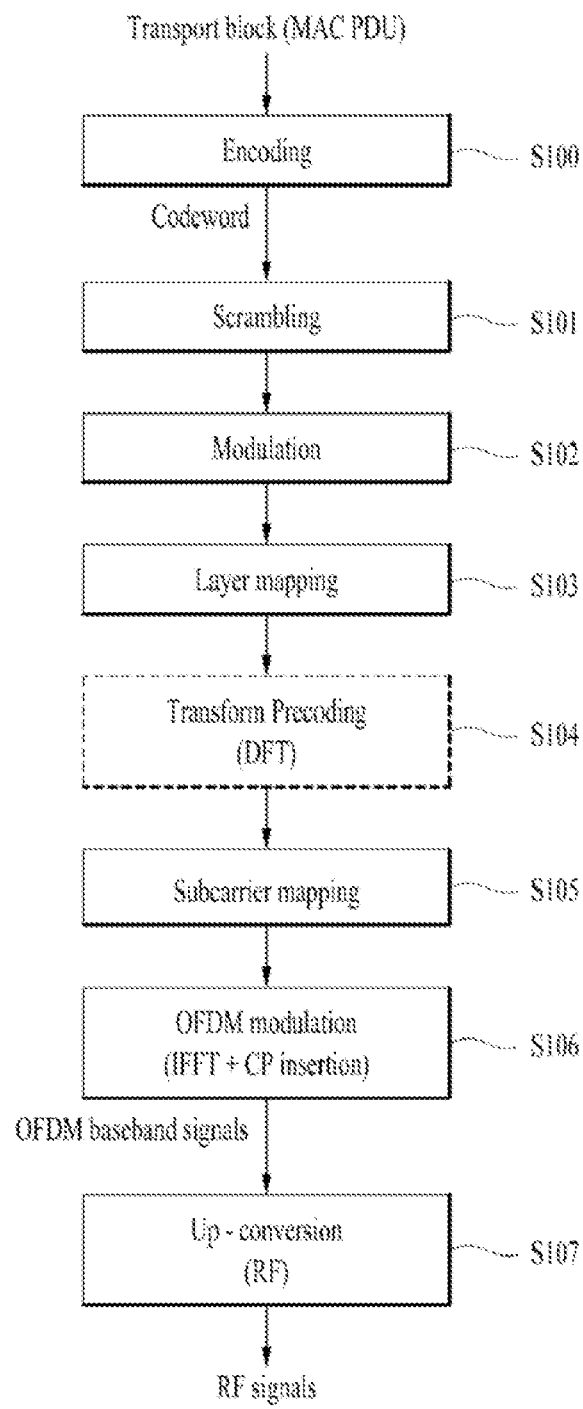
FIG. 16 illustrates an example of physical layer processing at a transmission side to which the present disclosure is applicable.

FIG. 16 illustrates physical layer processing at a transmitting side to which the present disclosure is applicable.

Table 3 shows a mapping relationship between UL transport channels and physical channels, and Table 4 shows a mapping relationship between UL control channel information and physical channels.

TABLE 3

| Transport channel | Physical channel |
|---|---|
| UL-SCH | PUSCH |
| RACH | PRACH |

TABLE 4

| Control information | Physical channel |
|---|---|
| UCI | PUCCH, PUSCH |

Table 5 shows a mapping relationship between DL transport channels and physical channels, and Table 6 shows a mapping relationship between DL control channel information and physical channels.

TABLE 5

| Transport channel | Transport channel |
|---|---|
| DL-SCH | PDSCH |
| BCH | PBCH |
| PCH | PDSCH |

TABLE 6

| Control information | Physical channel |
|---|---|
| DCI | PDCCH |

Table 7 shows a mapping relationship between sidelink transport channels and physical channels, and Table 8 shows a mapping relationship between sidelink control channel information and physical channels.

TABLE 7

| Transport channel | Transport channel |
|---|---|
| SL-SCH | PSSCH |
| SL-BCH | PSBCH |

TABLE 8

| Control information | Transport channel |
|---|---|
| SCI | PSCCH |

Figure 17:
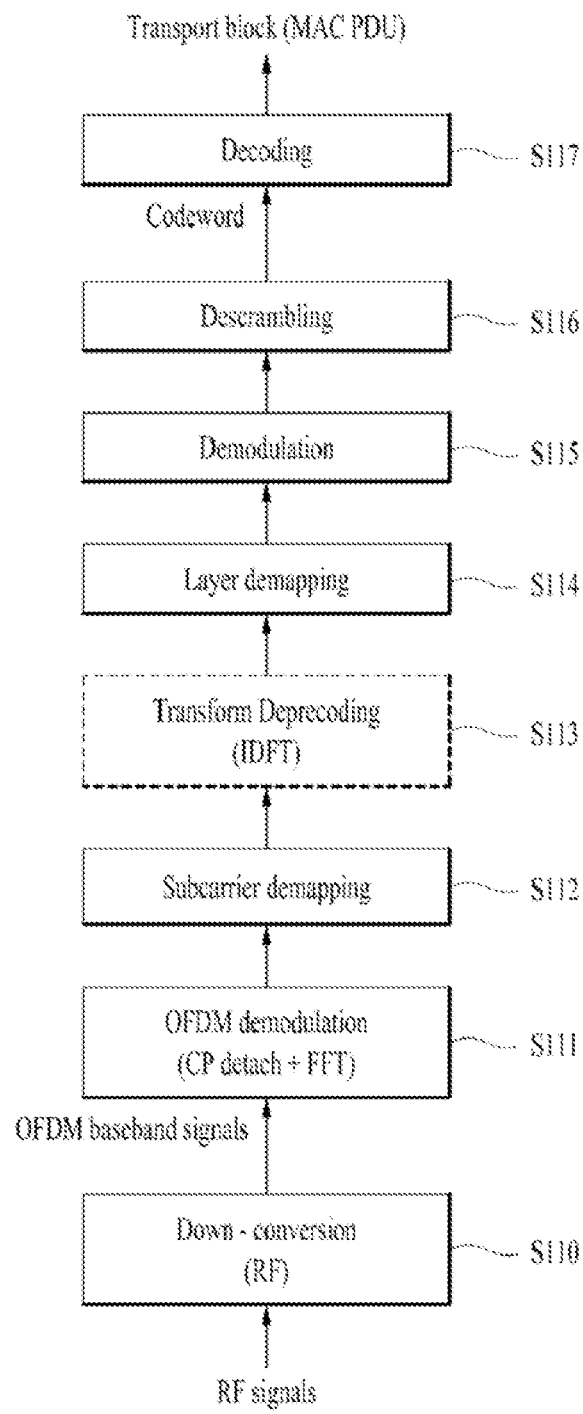
FIG. 17 illustrates an example of physical layer processing at a reception side to which the present disclosure is applicable.

Referring to FIG. 17, a transmitting side may encode a TB in step S100. The PHY layer may encode data and a control stream from the MAC layer to provide transport and control services via a radio transmission link in the PHY layer. For example, a TB from the MAC layer may be encoded to a codeword at the transmitting side. A channel coding scheme may be a combination of error detection, error correction, rate matching, interleaving, and control information or a transport channel demapped from a physical channel. Alternatively, a channel coding scheme may be a combination of error detection, error correcting, rate matching, interleaving, and control information or a transport channel mapped to a physical channel.

In the NR LTE system, the following channel coding schemes may be used for different types of transport channels and different types of control information. For example, channel coding schemes for respective transport channel types may be listed as in Table 9. For example, channel coding schemes for respective control information types may be listed as in Table 10.

TABLE 9

| Transport channel | Channel coding scheme |
|---|---|
| UL-SCH | LDPC(Low Density |
| DL-SCH | Parity Check) |
| SL-SCH | |
| PCH | |
| BCH | Polar code |
| SL-BCH | |

| Control information | Channel coding scheme |
| --- | --- |
| DCI | Polar code |
| SCI | |
| UCI | Block code, Polar code |

For transmission of a TB (e.g., a MAC PDU), the transmitting side may attach a CRC sequence to the TB. Thus, the transmitting side may provide error detection for the receiving side. In sidelink communication, the transmitting side may be a transmitting UE, and the receiving side may be a receiving UE. In the NR system, a communication device may use an LDPC code to encode/decode a UL-SCH and a DL-SCH. The NR system may support two LDPC base graphs (i.e., two LDPC base metrics). The two LDPC base graphs may be LDPC base graph 1 optimized for a small TB and LDPC base graph 2 optimized for a large TB. The transmitting side may select LDPC base graph 1 or LDPC base graph 2 based on the size and coding rate R of a TB. The coding rate may be indicated by an MCS index, I_MCS. The MCS index may be dynamically provided to the UE by a PDCCH that schedules a PUSCH or PDSCH. Alternatively, the MCS index may be dynamically provided to the UE by a PDCCH that (re)initializes or activates UL configured grant type 2 or DL semi-persistent scheduling (SPS). The MCS index may be provided to the UE by RRC signaling related to UL configured grant type 1. When the TB attached with the CRC is larger than a maximum code block (CB) size for the selected LDPC base graph, the transmitting side may divide the TB attached with the CRC into a plurality of CBs. The transmitting side may further attach an additional CRC sequence to each CB. The maximum code block sizes for LDPC base graph 1 and LDPC base graph 2 may be 8448 bits and 3480 bits, respectively. When the TB attached with the CRC is not larger than the maximum CB size for the selected LDPC base graph, the transmitting side may encode the TB attached with the CRC to the selected LDPC base graph. The transmitting side may encode each CB of the TB to the selected LDPC basic graph. The LDPC CBs may be rate-matched individually. The CBs may be concatenated to generate a codeword for transmission on a PDSCH or a PUSCH. Up to two codewords (i.e., up to two TBs) may be transmitted simultaneously on the PDSCH. The PUSCH may be used for transmission of UL-SCH data and layer-1 and/or layer-2 control information. While not shown in FIG. 16, layer-1 and/or layer-2 control information may be multiplexed with a codeword for UL-SCH data.

In steps S101 and S102, the transmitting side may scramble and modulate the codeword. The bits of the codeword may be scrambled and modulated to produce a block of complex-valued modulation symbols.

In step S103, the transmitting side may perform layer mapping. The complex-valued modulation symbols of the codeword may be mapped to one or more MIMO layers. The codeword may be mapped to up to four layers. The PDSCH may carry two codewords, thus supporting up to 8-layer transmission. The PUSCH may support a single codeword, thus supporting up to 4-layer transmission.

In step S104, the transmitting side may perform precoding transform. A DL transmission waveform may be general OFDM using a CP. For DL, transform precoding (i.e., discrete Fourier transform (DFT)) may not be applied.

A UL transmission waveform may be conventional OFDM using a CP having a transform precoding function that performs DFT spreading which may be disabled or enabled. In the NR system, transform precoding, if enabled, may be selectively applied to UL. Transform precoding may be to spread UL data in a special way to reduce the PAPR of the waveform. Transform precoding may be a kind of DFT. That is, the NR system may support two options for the UL waveform. One of the two options may be CP-OFDM (same as DL waveform) and the other may be DFT-s-OFDM. Whether the UE should use CP-OFDM or DFT-s-OFDM may be determined by the BS through an RRC parameter.

In step S105, the transmitting side may perform subcarrier mapping. A layer may be mapped to an antenna port. In DL, transparent (non-codebook-based) mapping may be supported for layer-to-antenna port mapping, and how beamforming or MIMO precoding is performed may be transparent to the UE. In UL, both non-codebook-based mapping and codebook-based mapping may be supported for layer-to-antenna port mapping.

For each antenna port (i.e. layer) used for transmission of a physical channel (e.g. PDSCH, PUSCH, or PSSCH), the transmitting side may map complex-valued modulation symbols to subcarriers in an RB allocated to the physical channel.

In step S106, the transmitting side may perform OFDM modulation. A communication device of the transmitting side may add a CP and perform inverse fast Fourier transform (IFFT), thereby generating a time-continuous OFDM baseband signal on an antenna port p and a subcarrier spacing configuration u for an OFDM symbol 1 within a TTI for the physical channel. For example, for each OFDM symbol, the communication device of the transmitting side may perform IFFT on a complex-valued modulation symbol mapped to an RB of the corresponding OFDM symbol. The communication device of the transmitting side may add a CP to the IFFT signal to generate an OFDM baseband signal.

In step S107, the transmitting side may perform up-conversion. The communication device of the transmitting side may upconvert the OFDM baseband signal, the SCS configuration u, and the OFDM symbol 1 for the antenna port p to a carrier frequency f0 of a cell to which the physical channel is allocated.

Figure 24:
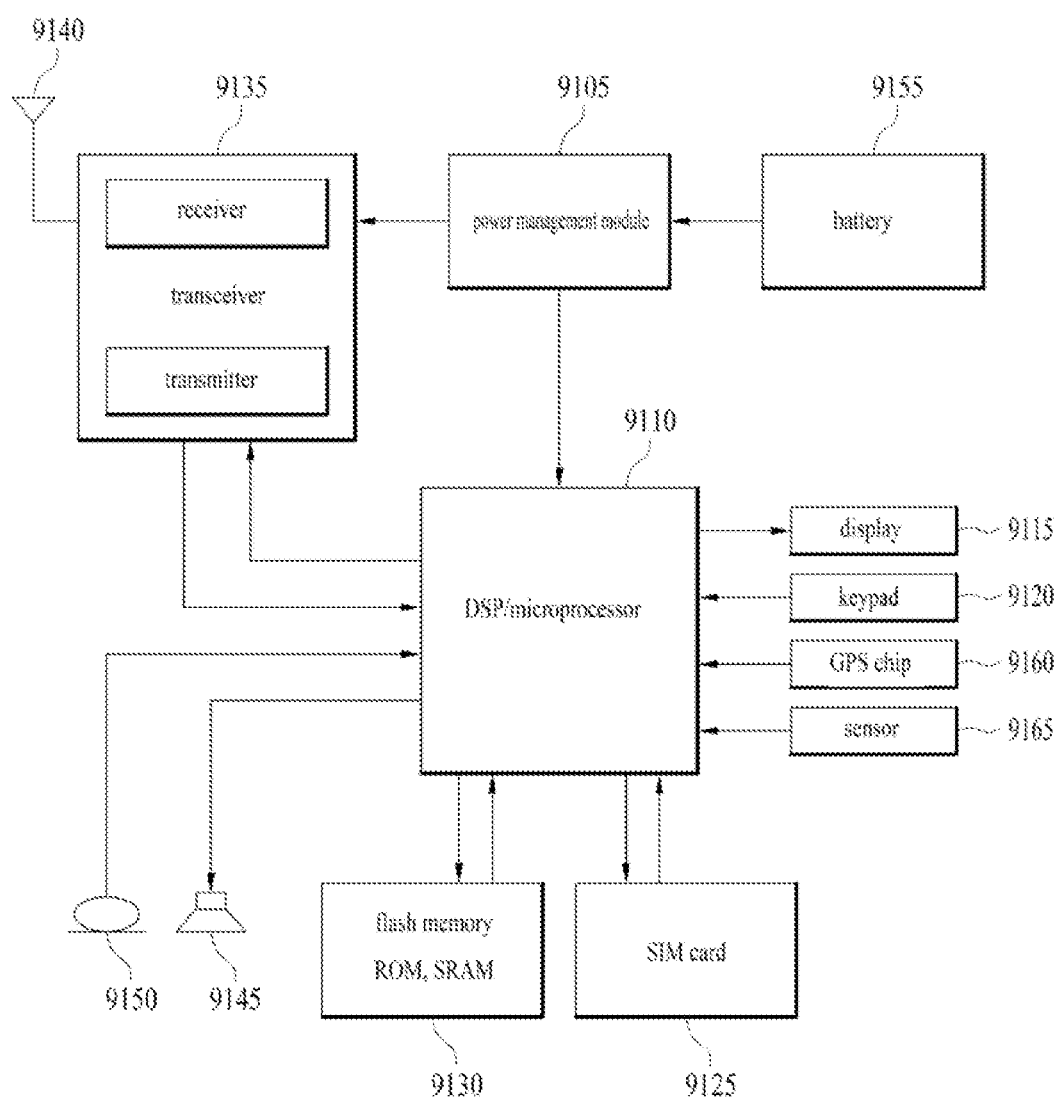

Processors 102 and 202 of FIG. 24 may be configured to perform encoding, scrambling, modulation, layer mapping, precoding transformation (for UL), subcarrier mapping, and OFDM modulation.

FIG. 17 illustrates PHY-layer processing at a receiving side to which the present disclosure is applicable.

The PHY-layer processing of the receiving side may be basically the reverse processing of the PHY-layer processing of a transmitting side.

In step S110, the receiving side may perform frequency downconversion. A communication device of the receiving side may receive a radio frequency (RF) signal in a carrier frequency through an antenna. A transceiver 106 or 206 that receives the RF signal in the carrier frequency may downconvert the carrier frequency of the RF signal to a baseband to obtain an OFDM baseband signal.

In step S111, the receiving side may perform OFDM demodulation. The communication device of the receiving side may acquire complex-valued modulation symbols by CP detachment and fast Fourier transform (FFT). For example, for each OFDM symbol, the communication device of the receiving side may remove a CP from the OFDM baseband signal. The communication device of the receiving side may then perform FFT on the CP-free OFDM baseband signal to obtain complex-valued modulation symbols for an antenna port p, an SCS u, and an OFDM symbol 1.

In step S112, the receiving side may perform subcarrier demapping. Subcarrier demapping may be performed on the complex-valued modulation symbols to obtain complex-valued modulation symbols of the physical channel. For example, the processor of a UE may obtain complex-valued modulation symbols mapped to subcarriers of a PDSCH among complex-valued modulation symbols received in a BWP.

In step S113, the receiving side may perform transform de-precoding. When transform precoding is enabled for a UL physical channel, transform de-precoding (e.g., inverse discrete Fourier transform (IDFT)) may be performed on complex-valued modulation symbols of the UL physical channel. Transform de-precoding may not be performed for a DL physical channel and a UL physical channel for which transform precoding is disabled.

In step S114, the receiving side may perform layer demapping. The complex-valued modulation symbols may be demapped into one or two codewords.

In steps S115 and S116, the receiving side may perform demodulation and descrambling. The complex-valued modulation symbols of the codewords may be demodulated and descrambled into bits of the codewords.

In step S117, the receiving side may perform decoding. The codewords may be decoded into TBs. For a UL-SCH and a DL-SCH, LDPC base graph 1 or LDPC base graph 2 may be selected based on the size and coding rate R of a TB. A codeword may include one or more CBs. Each coded block may be decoded into a CB to which a CRC has been attached or a TB to which a CRC has been attached, by the selected LDPC base graph. When CB segmentation has been performed for the TB attached with the CRC at the transmitting side, a CRC sequence may be removed from each of the CBs each attached with a CRC, thus obtaining CBs. The CBs may be concatenated to a TB attached with a CRC. A TB CRC sequence may be removed from the TB attached with the CRC, thereby obtaining the TB. The TB may be delivered to the MAC layer.

Figure 22:
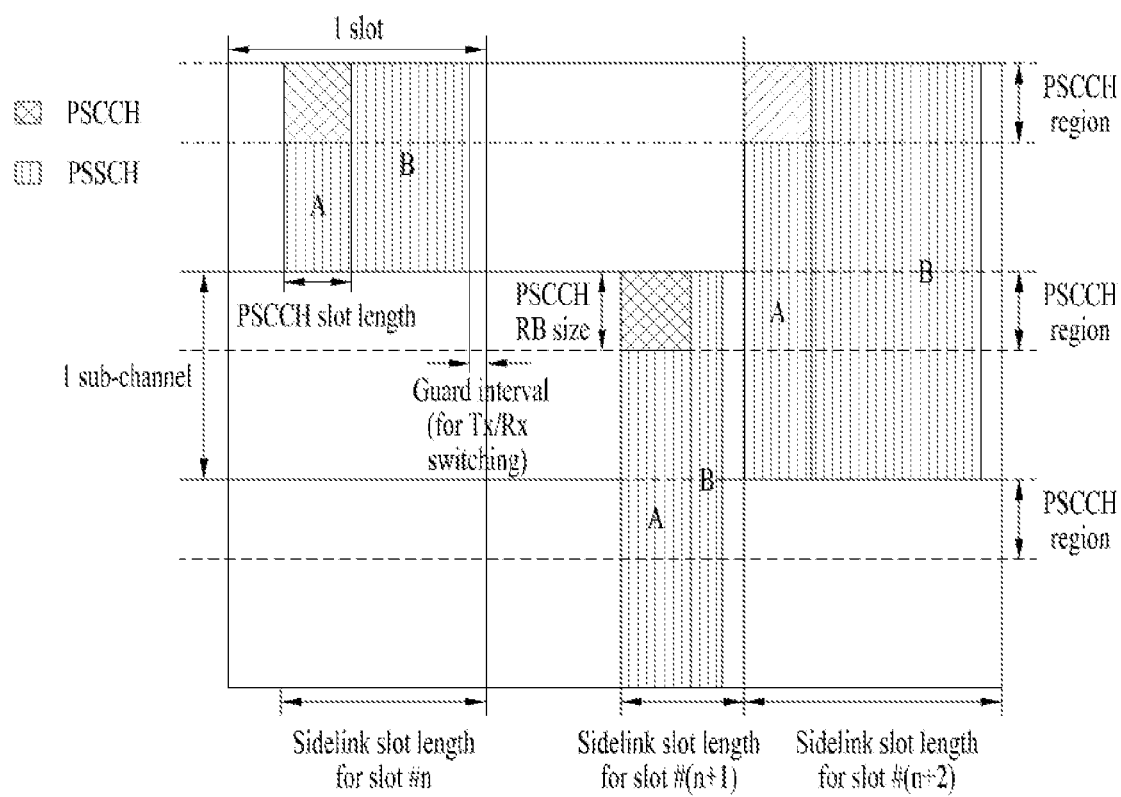

Each of processors 102 and 202 of FIG. 22 may be configured to perform OFDM demodulation, subcarrier demapping, layer demapping, demodulation, descrambling, and decoding.

In the above-described PHY-layer processing on the transmitting/receiving side, time and frequency resources (e.g., OFDM symbol, subcarrier, and carrier frequency) related to subcarrier mapping, OFDM modulation, and frequency upconversion/downconversion may be determined based on a resource allocation (e.g., an UL grant or a DL assignment).

Synchronization acquisition of a sidelink UE will be described below.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 18:
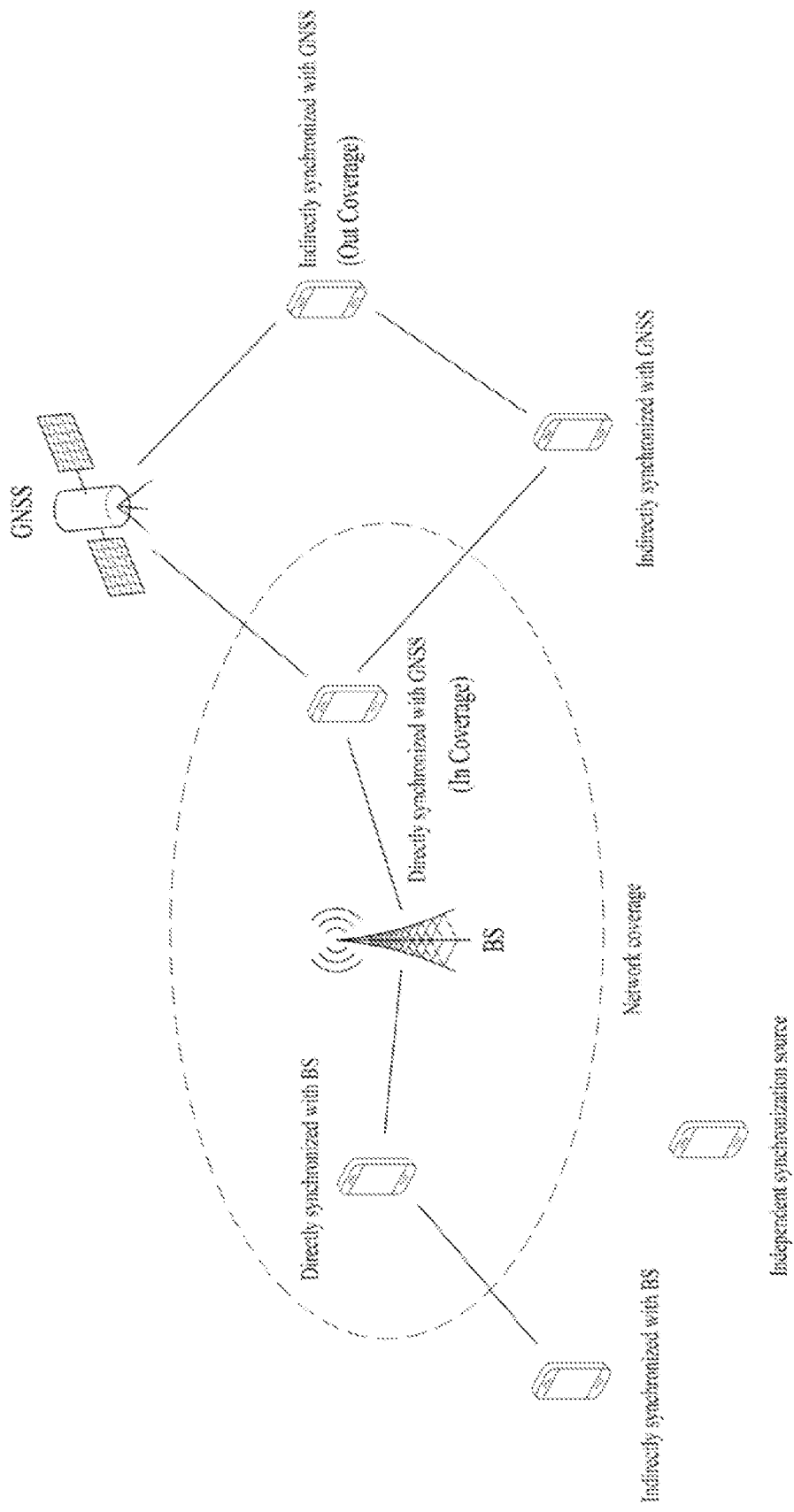
FIG. 18 illustrates a synchronization source or synchronization reference in V2X to which the present disclosure is applicable.

FIG. 18 illustrates a V2X synchronization source or reference to which the present disclosure is applicable.

Referring to FIG. 18, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Table 11. Table 11 is merely an example, and the relationship between synchronization sources and synchronization priorities may be defined in various manners.

TABLE 11

| Priority | GNSS-based synchronization | BS-based synchronization (eNB/gNB-based synchronization) |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or BS-based synchronization may be (pre)determined. In a single-carrier operation, the UE may derive its transmission timing from an available synchronization reference with the highest priority.

In the conventional sidelink communication, the GNSS, eNB, and UE may be set/selected as the synchronization reference as described above. In NR, the gNB has been introduced so that the NR gNB may become the synchronization reference as well. However, in this case, the synchronization source priority of the gNB needs to be determined. In addition, a NR UE may neither have an LTE synchronization signal detector nor access an LTE carrier (non-standalone NR UE). In this situation, the timing of the NR UE may be different from that of an LTE UE, which is not desirable from the perspective of effective resource allocation. For example, if the LTE UE and NR UE operate at different timings, one TTI may partially overlap, resulting in unstable interference therebetween, or some (overlapping) TTIs may not be used for transmission and reception. To this end, various implementations for configuring the synchronization reference when the NR gNB and LTE eNB coexist will be described based on the above discussion. Herein, the synchronization source/reference may be defined as a synchronization signal used by the UE to transmit and receive a sidelink signal or derive a timing for determining a subframe boundary. Alternatively, the synchronization source/reference may be defined as a subject that transmits the synchronization signal. If the UE receives a GNSS signal and determines the subframe boundary based on a UTC timing derived from the GNSS, the GNSS signal or GNSS may be the synchronization source/reference.

In 5G/NR, the number of OFDM symbols used in UL/DL within one slot may be varied. Therefore, the number of OFDM symbols per slot used in a sidelink may be varied. In the legacy LTE-V2X, since control and data signals are transmitted by FDM, if this flexible slot structure is used for the sidelink, the number of symbols of the control signal may be varied based on the number of OFDM symbols constituting the slot. Generally, it is likely that payload of the control signal is previously determined, and if the number of OFDM symbols available for the control signal is varied per slot, a problem may occur in that a coding rate of the control signal is varied based on a type of the slot. Also, since a receiving UE should buffer the number of OFDM symbols for decoding the control signal, differently per slot, implementation complexity of a UE for decoding the control signal may be increased if the control signal and the data signal are simply subjected to FDM within one slot in a state that the number of OFDM symbols constituting one slot is varied.

Therefore, considering the problems, embodiments for a method for transmitting a control signal, which is applicable to the case that the number of symbols within a slot is varied, will be described.

Embodiment

A sidelink UE according to one embodiment of the present disclosure may transmit a PSCCH (Physical Sidelink Control Channel) by using a plurality of OFDM symbols within a slot, and may transmit a PSSCH (Physical Sidelink Shared Channel) related to the PSCCH.

Figure 19:
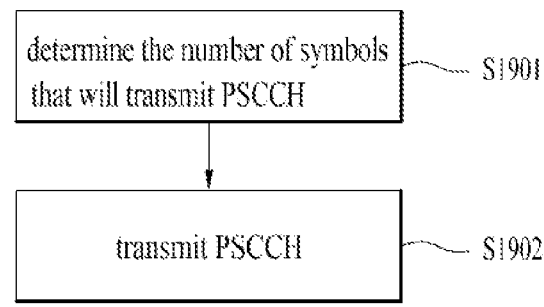
FIG. 19 is a flow chart related to one embodiment of the present disclosure.

In this case, the number of symbols used for PSCCH transmission may be variable/changeable in a state that the number of symbols within a slot is variable. That is, the number of symbols used for PSCCH transmission may be changed based on a change of the number of symbols included in the slot. A relationship between the number of symbols included in the slot and the number of symbols used for PSCCH transmission may be preconfigured, delivered through physical layer signaling or delivered through higher layer signaling. That is, the UE may determine the number of symbols which will transmit PSCCH (S1901 of FIG. 10), and may transmit the PSCCH through the determined symbols (S1902 of FIG. 19). At this time, the number of symbols which will transmit the PSCCH may be determined by a value preset based on the number of symbols included in the slot, or may be determined by a value indicated through higher layer/physical layer signaling.

For example, if the number of symbols included in the slot is k (integer), m (integer) number of symbols may be preconfigured to be used for PSCCH transmission or indicated by physical layer/higher layer signaling.

However, if the number of symbols used for PSCCH transmission is variable, particularly if the number of symbols used for PSCCH transmission is reduced, since it is not possible to make sure of a coding rate, decoding performance of the PSCCH may be deteriorated. In order to solve this, a PSCCH format different per slot may be configured. For example, a payload size of the PSCCH or a RB (Resource Block) size to which the PSCCH is transmitted may be set to be changed based on the change of the number of symbols included in the slot.

In detail, the payload size of the PSCCH may be varied based on the number of OFDM symbols constituting a slot. In this method, a size of each field (any one field or one or more fields) such as a resource allocation filed or MCS field or a reserved field may partially be reduced to reduce the payload size of the PSCCH, whereby a damage of a coding rate, which is caused as the number of OFDM symbols is reduced, may be recovered. A payload size per PSCCH field may previously be determined based on the number of OFDM symbols per slot. At this time, flexibility of some indication may be reduced by reducing the size of each field. For example, since a bit size is reduced using a portion of the MCS field (conventionally), a problem may occur in that MCS capable of performing indication is not used. However, since a service or payload size which is required may be limited to payload that uses a specific slot, this damage (loss of indication flexibility) may not be great.

Also, a size of RB to which the PSCCH is transmitted may be varied based on the number of OFDM symbols constituting a slot. This is to increase the number of required REs by varying RB size to make sure of a coding rate of the PSCCH, and may complement the problem (loss of indication flexibility) of the aforementioned method. However, in this method, since the PSCCH uses more frequency resources, a problem may occur in that a size of frequency resources to be used by the PSSCH is reduced. However, as described above, the problem may not be serious if a size of payload transmitted to a short slot is not great. For this method, a size of frequency resources reserved by the PSCCH may previously be determined based on the number of OFDM symbols.

Also, a method for merging two methods for varying a payload size and a size of RB to which PSCCH is transmitted may be used. For example, the payload size of the PSCCH may be varied based on the number of OFDM symbols constituting one slot and at the same time the size of the frequency resources reserved by the PSCCH may be varied. This mapping relationship may previously be determined.

Meanwhile, the PSCCH may repeatedly be transmitted through at least one or more symbols within a slot. In this way, as the PSCCH is repeatedly transmitted, coverage of the PSCCH may be improved, or other information (CQI, HARQ ACK/NACK, buffer status, etc.) may be indicated.

Figure 20:
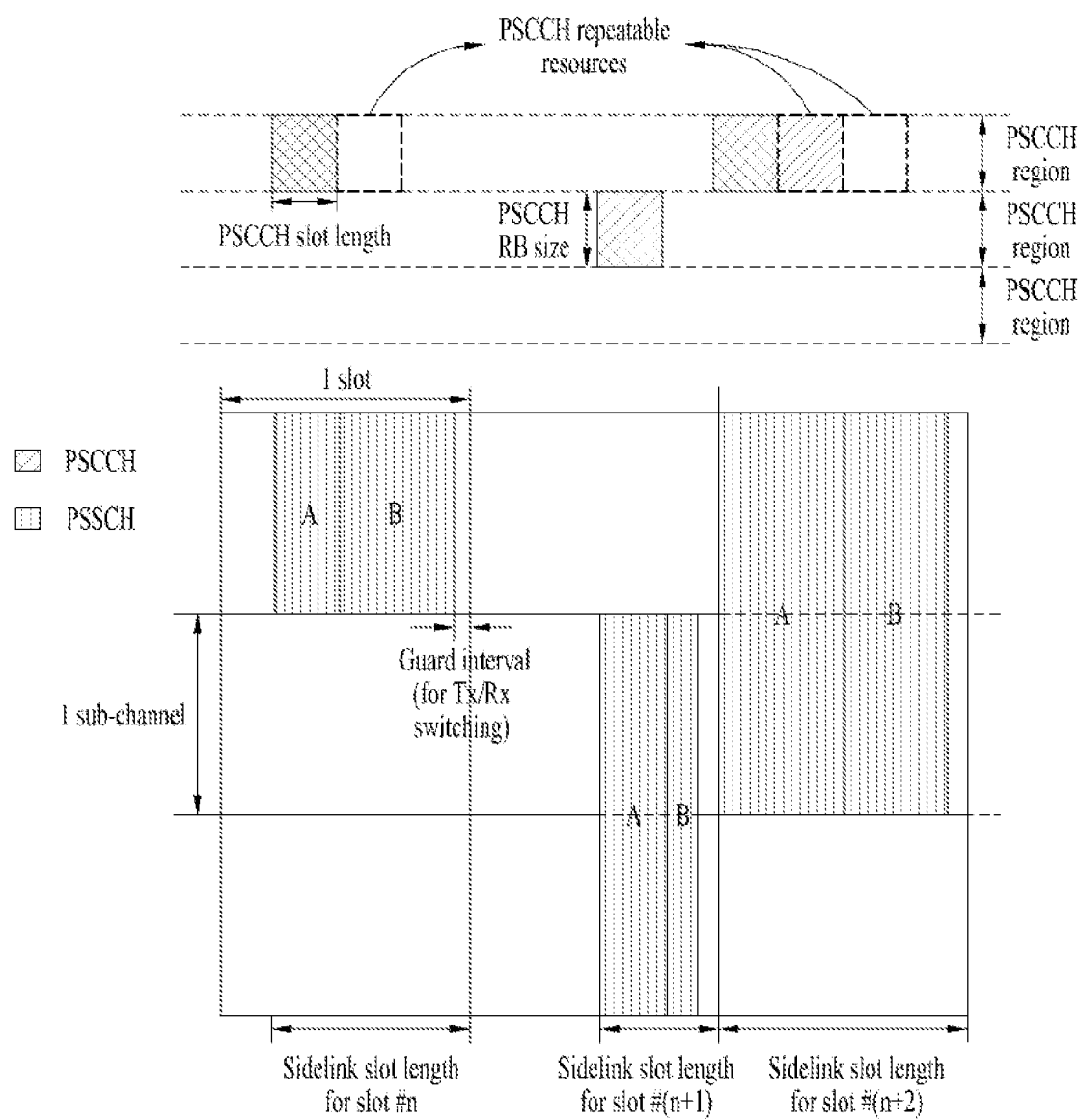
FIGS. 20 to 22 are views illustrating various embodiments of the present disclosure.
Figure 21:
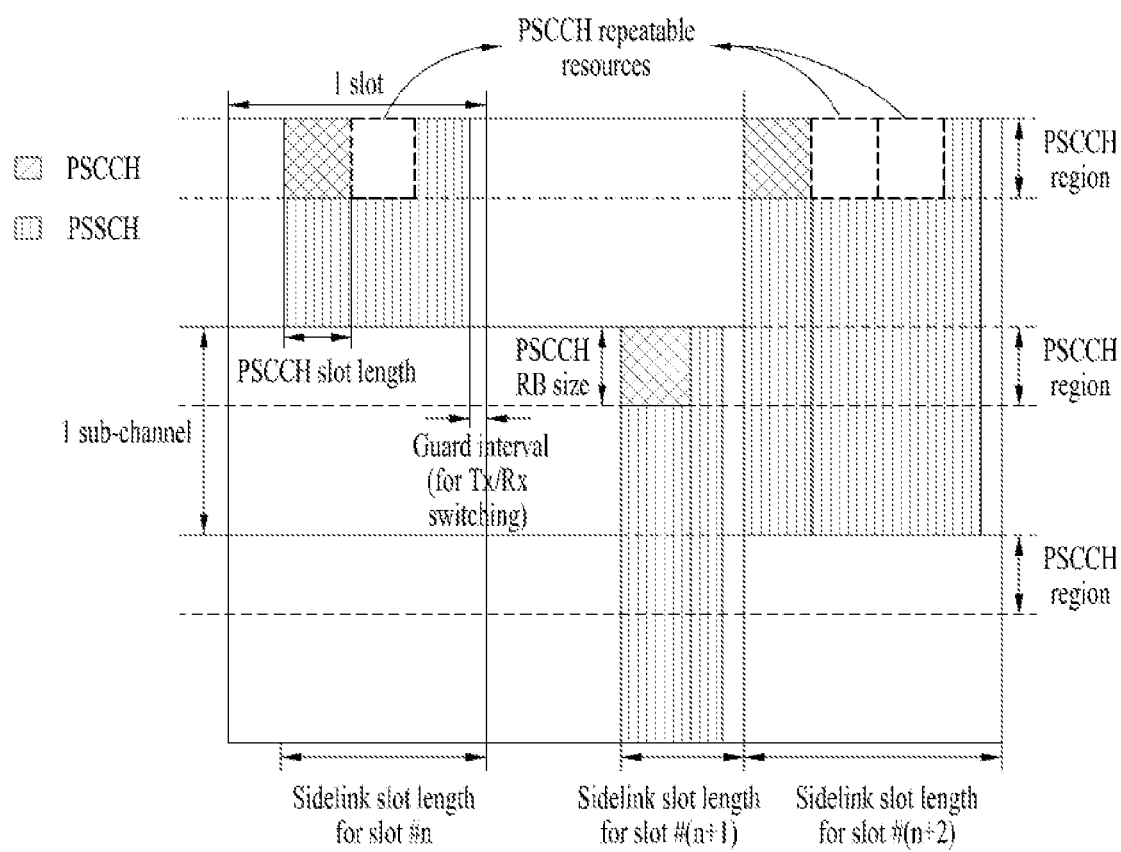

Examples related to repeated transmission of the PSCCH are shown in FIGS. 20 and 21. In FIG. 20, a frequency resource region is divided into three subchannels, a UE selects resources in a unit of subchannel, and the PSCCH and the PSSCH are based on that they are configured by non-adjacent pool configuration. At this time, if OFDM symbols of the PSCCH do not span one slot completely (or if symbols used for PSCCH transmission are smaller than those used for PSCCH transmission related to the PSCCH), frequency resources of some PSCCH region are not used, whereby the PSCCH is repeatedly transmitted from this region (PSCCH repeatable resources). In FIG. 21, the PSCCH and the PSSCH are configured by adjacent pool configuration in a status similar to FIG. 20. Even in FIG. 21, the PSCCH only uses some symbols within a slot, and the PSCCH may be transmitted from the other regions (PSCCH repeatable resources) within the slot.

In this way, if the PSCCH is repeatedly transmitted, this PSCCH may have a redundancy version (RV) of a preconfigured pattern. That is, RV may differently be fixed by a predetermined pattern. For example, the RV may be varied in the order of 0, 2, 3 and 1, may be varied in the pattern of 0, 3, 0, 3, or may be fixed to 0, 0, 0, 0. Also, PSCCH RV pattern may be indicated by the transmitting UE, or may previously be determined. If the PSCCH RV pattern is varied by the transmitting UE, it may be indicated by a first PSCCH. For example, control information for indicating RV pattern may be subjected to piggy back to a certain RE, or may be indicated by DMRS sequence. For example, information on RV pattern of the PSCCH, and/or PSCCH repetition times and/or purpose of PSCCH (for data scheduling and transmission of feedback information) may be subjected to piggyback to some REs, or may be indicated by DMRS sequence. In more detail, repeated transmission of PSCCH (whether to repeatedly transmit PSCCH) or preconfigured pattern may be indicated by DMRS (Demodulation reference signal) for PSCCH. That is, the transmitting UE may indicate whether it has repeated PSCCH and/or RV pattern by using DMRS of PSCCH. If PSCCH repetition is used, DMRS base sequence or CS or initialization ID may be set to a specific value. The receiving UE may take correlation for the DMRS of the first PSCCH and then perform PSCCH combining/decoding by determining whether PSCCH has been repeated for a symbol group and what RV pattern has been used.

The number of times for repeated transmission of the PSCCH may be determined by the UE that transmits the PSCCH. For example, the transmitting UE may determine to repeatedly transmit or transmit PSCCH from at least "one time to floor (the number of OFDM symbols constituting a slot/the number of OFDM symbols of PSCCH) times" within the slot. The repeated transmission times may be determined considering one or more of packet priority and packet arrival coverage (or target coverage). In this case, for example, the network or the BS may (previously) configure, for the UE, repeated transmission times (range) selectable per combination of packet related requirements (e.g., priority, target coverage, latency, etc.), resource pool congestion level, etc. In PSCCH/PSSCH adjacent pool configuration, if the PSCCH is repeated, the number of REs of the PSSCH may be reduced. The receiving UE may perform decoding by considering the status that the number of PSSCH REs is reduced as much as REs used by the PSCCH.

Unlike the aforementioned description, the number of symbols used for PSCCH transmission may be configured so as not to be changed even in the state that the number of symbols within a slot is variable. That is, a PSCCH format is configured regardless of a slot structure, and the number of OFDM symbols constituting a control signal (PSCCH) is fixedly configured even though the number of OFDM symbols constituting one slot is varied. For example, a payload size of the PSCCH or a size of RB to which the PSCCH is transmitted may be fixed based on a slot in which the smallest number of symbols is used for PSCCH transmission. In detail, a set of slots used as a sidelink may be referred to as a sidelink (PSCCH/PSSCH) time resource pool. At this time, based on the slot having the smallest number of OFDM symbols among the slots configured to the resource pool, the number of OFDM symbols constituting PSCCH and/or RB size constituting PSCCH and/or payload of the PSCCH may be determined. In this way, the number of OFDM symbols to which one PSCCH is transmitted may explicitly be signaled by the network, or may be a value implicitly acquired for the transmitting and receiving UEs by the resource pool configuration. At this time, it is important that the PSCCH format is not changed even though the number of OFDM symbols constituting a slot is changed. Therefore, since the receiving UE performs decoding for the fixed PSCCH in a specific resource pool, the receiving UE does not need to implement various kinds of PSCCH decoding circuits, whereby implementation complexity may be reduced. The number of OFDM symbols within a slot to which the PSCCH is transmitted and/or RB size constituting the PSCCH and/or payload of the PSCCH may previously be determined, or may be signaled to the UE by the network per resource pool or cell or carrier or bandwidth part through a physical layer signal or a higher layer signal.

Meanwhile, regarding configuration of a transmission power, in the case that a specific UE transmits a sidelink signal (PSCCH/PSSCH) within one slot, a transmission power of a region to which a control signal is transmitted, a total transmission power in a region to which a data signal is transmitted, or a transmission power of the PSSCH may be configured differently. For time domain interpolation between channel estimation of the PSSCH and an estimated channel, it is preferable that a transmission power configured for RE of the PSSCH is equally maintained. However, if power boosting of the PSCCH is applied, a transmission power per RE of the PSSCH of the symbol to which the PSCCH is transmitted and a transmission power per RE of the PSSCH of the symbol to which the PSSCH is only transmitted may be different from each other. For example, the term "transmission power per RE" may enlargedly be interpreted as "channel transmission related PSD (POWER SPECTRAL DENSITY)" or "PSD per RE".

Regarding this, if the PSCCH and the PSSCH are subjected to FDM (Frequency division multiplexing) in at least a portion within the slot, a transmission power per RE of the PSSCH may be determined after a transmission power used for the PSCCH is excluded from the total available transmission power. That is, when a symbol group A (PSSCH symbol group to which PSCCH subjected to FDM with the PSSCH is transmitted) determines a transmission power, after the transmission power used for the PSCCH is excluded from the total available transmission power, the corresponding transmission power is computed. At this time, a method for maintaining a transmission power per RE used in the symbol group A may be considered even in a symbol group B (PSSCH symbol group in which PSCCH is not subjected to FDM with the PSSCH). At this time, in the case that RB size is different between the symbol groups, considering this case, the transmission power of the symbol group B may be determined to maintain a power per RE. In other words, in the case that power boosting is applied to the PSCCH rather than the PSSCH in the symbol group A (or in the case that power boosting is applied to the PSCCH), the power used for the PSCCH is excluded from the total available power and then the other power is used for the PSSCH. At this time, the transmission power per RE in the symbol group A may be used even in the symbol group B to maintain the transmission power per RE. That is, the transmission power determined in the symbol group A may be used even for the transmission power per RE of the PSSCH which is not subjected to FDM with the PSCCH in at least a portion of the slot. In this case, since the transmission power per RE is maintained in view of the receiving UE, channel estimation performance may be improved.

As another example, MPR (Maximum Power Reduction) applied when the PSCCH is subjected to FDM with the PSSCH in at least a portion of the slot may be applied to even the case that the PSCCH is not subjected to FDM with the PSSCH. That is, the MPR applied to the symbol group A is equally applied to the symbol group B. When the PSCCH and the PSSCH are transmitted from the same symbol, the MPR operation for excluding a portion from a maximum transmission power may be performed due to a problem that PAPR (peak-to-average-power-ratio)/CM (cubic metric) is increased. At this time, although such an operation is not required for the symbol group B, the MPR may be applied to the symbol group B to improve channel estimation performance and not to make a power transient period between the symbol groups.

Meanwhile, when RB size of the symbol group A is calculated, the RB size of the PSCCH may be excluded. This may be exceptional in the case that frequency resource regions of the PSCCH and the PSSCH are non-adjacently separated from each other. At this time, when the frequency domain to which the PSCCH is transmitted is separated from the frequency domain to which the PSSCH is transmitted (non-adjacent PSCCH/PSSCH pool configuration), the RB size of the PSSCH may be equal regardless of the symbol group.

As still another example, the PSCCH may be transmitted from specific time frequency resources within one slot. For example, when OFDM symbol region that may be used as a sidelink within each slot is previously determined or signaled by the network, the transmitting UE may assume that first to Kth symbols of the OFDM symbols, which may be used as a sidelink within each slot, correspond to a time domain to which the PSCCH may be transmitted. In this case, K may previously be determined or set by the network. At this time, although the first symbol may be the time domain to which the PSCCH may be transmitted, the PSCCH may be transmitted from nth to (n+K)th symbols of the OFDM symbols used as a sidelink within the slot, so as to avoid a period where some REs of the PSCCH are not digitalized normally while AGC (automatic gain control) is being performed. In this case, the PSCCH may be disposed outside an AGC period to improve decoding performance of the PSCCH. For example, the PSSCH or (predefined) DUMMY information may be mapped/transmitted to symbols prior to the Nth symbol.

Figure 23:
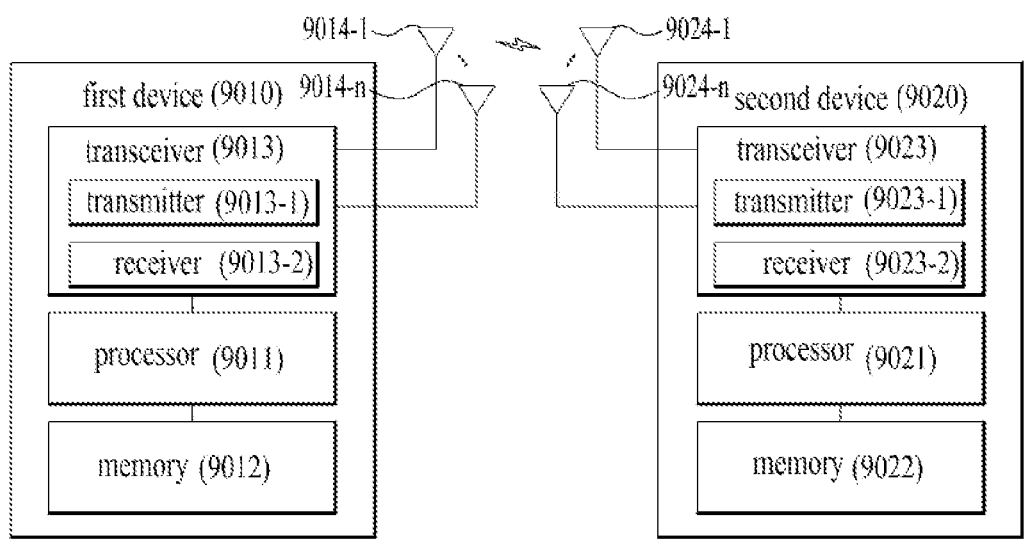
FIGS. 23 to 29 illustrate various devices to which the present disclosure is applicable.

The frequency resource region to which the PSCCH may be transmitted may also be configured by network. At this time, the frequency domain to which the PSCCH is transmitted may be overlapped to the region to which the PSSCH is transmitted (PSCCH/PSSCH adjacent pool configuration) or may be separated from the region to which the PSSCH is transmitted (PSCCH/PSSCH non-adjacent pool configuration). FIG. 23 illustrates transmission regions of the PSCCH and the PSSCH when the frequency resource region is divided into three subchannels, the UE selects resources in a unit of subchannel, and the PSCCH and the PSSCH are configured by adjacent pool configuration. The region to which the PSCCH may be transmitted per slot illustrates that the time/frequency resources to which the UE transmits signals are left top portions (shaded portions). In FIG. 23, the number of OFDM symbols used for sidelink is different per slot, and a portion of the last of the sidelink within each slot may be configured as a guard period for Tx/Rx switching.

Meanwhile, although the PSCCH may be repeated in the time domain as shown in FIGS. 20 to 22 to enlarge coverage of the control channel, the PSCCH may be enlarged and transmitted to the frequency domain (by using more RBs). This is to lower a coding rate of the PSCCH by making sure of more REs, thereby enlarging coverage.

Meanwhile, a starting symbol of the PSSCH may be signaled by the PSCCH such that the symbol group A, that is, a PSSCH symbol group, to which the PSCCH subjected to FDM with the PSSCH is transmitted, may not exist. If the PSCCH indicates the starting symbol of the PSSCH in a unit of symbol, the symbols may be divided into three regions (A1, A2 and B in due order), that is, the PSCCH is only transmitted to some symbols within one slot, the PSCCH and the PSCCH, which are subjected to FDM, are transmitted to another some symbols, and the PSSCH is only transmitted to the other symbols. Alternatively, the PSCCH may indicate whether the PSSCH and the PSCCH will be allowed to be subjected to FDM, through 1 bit. The latter case is advantageous in that the number of bits indicating the starting symbol of the PSSCH by the PSCCH may be reduced. In the former case, some important control information may be transmitted by being mapped in only the symbol A1, and the other control information may be transmitted by being mapped in only the symbol A2.

Meanwhile, the PSCCH may be transmitted within one slot independently (without PSSCH), or may be transmitted by being subjected to FDM with the PSSCH. The UE may configure the DMRS of the PSCCH differently based on the number of symbols to which the PSCCH is transmitted, RB size and PSCCH format, to identify the DMRS of the PSCCH from the case that the PSCCH is only transmitted to some symbols as described above. For example, the UE may use format information of the PSCCH and/or information on the number of symbols and/or RB size and/or multiplexing scheme information with the PSSCH in determining initialization parameter of the DMRS, or RE (frequency shift) position or cyclic shift.

Through the above method, the receiving UE may previously determine PSCCH format used by blind detection of the DMRS, and may perform PSCCH decoding. This is advantageous in that PSCCH blind decoding complexity may be reduced in a specific resource.

Meanwhile, in the case that a starting timing of the PSSCH is indicated by the PSCCH to enlarge coverage of the PSCCH, or in the case that the PSCCH is independently transmitted within a slot or transmitted by FDM with the PSSCH, it is required to determine the case that these options may be used. For example, when the UE desires to enlarge coverage of the control channel, for example, desires to allow the control signal to reach a remote position such that the other UEs (which have received the control information) do not use the corresponding resource, the corresponding UE may transmit the control signal through TDM with the data signal. In this case, for transmission of message having high reliability (or low target error probability) or high priority or transmission of preemption related information, the PSCCH may be transmitted by TDM with the PSSCH. Alternatively, if target latency requirement is tight to be less than a certain threshold, the control signal may be subjected to TDM with the data signal for fast decoding of the receiving UE.

The network may signal a case that a corresponding PSCCH transmission scheme will be used, to the UE through a physical layer signal or a higher layer signal. For example, a configuration of a PSCCH transmission scheme/format based on a random QoS parameter (including the number of symbols, RB size, modulation scheme, MIMO transmission scheme, etc.) may be signaled to the UE through a physical or higher layer signal, or this configuration may previously be determined. This configuration may be configured per resource pool.

Meanwhile, QoS parameters (priority, reliability, coverage, and latency) (of packet or session or QoS flow) that can be used by the UE per resource pool may be signaled to the UE through a physical layer signal or higher layer signal. For example, configuration of priority level, reliability, coverage and latency, which can use a resource pool A, may be signaled by the network. This is to facilitate interference control by allowing packets having similar features to be multiplexed or reduce interference by allocating more resources to specific QoS configuration, thereby easily achieving performance.

Meanwhile, PSCCH/PSSCH association scheme or PSCCH format per QoS parameter (of packet or session or QoS flow) that can be used per resource pool may be signaled from the network to the UE through a physical layer signal or higher layer signal. For example, a PSCCH transmission scheme (the number of symbols, RB size, and multiplexing option with PSSCH) that can be used in a specific QoS parameter (e.g., latency) may be configured by the network.

The UE may select a PSCCH transmission scheme to be used by itself within a range configured by the network. The UE may determine a PSCCH transmission scheme per QoS parameter in accordance with UE implementation.

Meanwhile, the embodiments of the present disclosure are not limited to direct communication between UEs, and may be used for an uplink or downlink, and in this case, the above proposed methods may be used by the BS or relay node.

Since the embodiments of the above-described proposed methods may be included in one of the implementation methods of the present disclosure, it will be apparent that the embodiments may be regarded as a kind of proposed methods. In addition, the above-described proposed methods may independently be implemented, but may also be implemented in the form of combination (or merge) thereof. A rule may be defined such that information as to whether to apply the proposed methods (or information on the rules of the proposed methods) may be notified from the BS to the UE or from the transmitting UE to the receiving UE through a predefined signal (e.g., physical layer signal or higher layer signal).

Overview of Device According to the Embodiment of the Present Disclosure

Hereinafter, a device to which the present disclosure is applicable will be described.

FIG. 23 illustrates a wireless communication device according to one embodiment of the present disclosure.

Referring to FIG. 23, a wireless communication system may include a first device 9010 and a second device 9020.

The first device 9010 may be a device related to a base station, a network node, a transmitting user equipment (UE), a receiving UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 9020 may be a device related to a base station, a network node, a transmitting UE, a receiving UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glasses type terminal (smart glasses), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing an object or background of a virtual world. For example, the AR device may include a device implementing an object or background of a virtual world by connecting it to an object or background of a real world. For example, the MR device may include a device implementing the object or background of the virtual world by merging it with the object or background of the real world. For example, the hologram device may include a device implementing a 360-degree stereographic image by recording and playing back stereographic information using the interference phenomenon of light generated when two lasers called holography meet each other. For example, the public safety device may include a video relay device or a video device capable of being worn on a user's body. For example, the MTC device and the IoT device may be devices that do not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 9010 may include at least one processor such as a processor 9011, at least one memory device such as memory 9012, and at least one transceiver such as a transceiver 9013. The processor 9011 may perform the above-described functions, procedures, and/or methods. The processor 9011 may implement one or more protocols. For example, the processor 9011 may implement one or more layers of a radio interface protocol. The memory 9012 is connected to the processor 9011, and may store various types of information and/or instructions. The transceiver 9013 is connected to the processor 9011, and may be controlled to transmit and receive radio signals. The transceiver 9013 may be connected with one or more antennas 9014-1 to 9014-n, and the transceiver 9013 may be configured to transmit and receive user data, control information, a radio signal/channel, which are mentioned in the methods and/or operation flow chart in this specification, through one or more antennas 9014-1 to 9014-n. In this specification, the n antennas may be the number of physical antennas or the number of logical antenna ports.

The second device 9020 may include at least one processor such as a processor 9021, at least one memory device such as memory 9022, and at least one transceiver such as a transceiver 9023. The processor 9021 may perform the above-described functions, procedures and/or methods. The processor 9021 may implement one or more protocols. For example, the processor 9021 may implement one or more layers of a radio interface protocol. The memory 9022 is connected to the processor 9021, and may store various types of information and/or instructions. The transceiver 9023 is connected to the processor 9021 and may be controlled to transmit and receive radio signals. The transceiver 9023 may be connected with one or more antennas 9024-1 to 9024-n, and the transceiver 9023 may be configured to transmit and receive user data, control information, a radio signal/channel, which are mentioned in the methods and/or operation flow chart in this specification, through one or more antennas 9024-1 to 9024-n.

The memory 9012 and/or the memory 9022 may be connected inside or outside the processor 9011 and/or the processor 9021, respectively, and may be connected to another processor through various technologies, such as a wired or wireless connection. FIG. 24 illustrates a wireless communication device according to an implementation of the present disclosure.

FIG. 24 shows a more detailed view of the first or second device 9010 or 9020 of FIG. 22. However, the wireless communication device of FIG. 24 is not limited to the first or second device 9010 or 9020. The wireless communication device may be any suitable mobile computing device for implementing at least one configuration of the present disclosure such as a vehicle communication system or device, a wearable device, a portable computer, a smart phone, etc.

Referring to FIG. 24, the wireless communication device (UE) may include at least one processor (e.g., DSP, microprocessor, etc.) such as a processor 9110, a transceiver 9135, a power management module 9105, an antenna 9140, a battery 9155, a display 9115, a keypad 9120, a GPS chip 9160, a sensor 9165, a memory 9130, a subscriber identification module (SIM) card 9125 (which is optional), a speaker 9145, and a microphone 9150. The UE may include at least one antennas.

The processor 9110 may be configured to implement the above-described functions, procedures, and/or methods. In some implementations, the processor 9110 may implement one or more protocols such as radio interface protocol layers.

The memory 9130 is connected to the processor 9110 and may store information related to the operations of the processor 9110. The memory 9130 may be located inside or outside the processor 9110 and connected to other processors through various techniques such as wired or wireless connections.

A user may enter various types of information (e.g., instructional information such as a telephone number) by various techniques such as pushing buttons of the keypad 9120 or voice activation using the microphone 9150. The processor 9110 may receive and process the information from the user and perform appropriate functions such as dialing the telephone number. For example, the processor 9110 data may retrieve data (e.g., operational data) from the SIM card 9125 or the memory 9130 to perform the functions. As another example, the processor 9110 may receive and process GPS information from the GPS chip 9160 to perform functions related to the location of the UE, such as vehicle navigation, map services, etc. As a further example, the processor 9110 may display various types of information and data on the display 9115 for user reference and convenience.

The transceiver 9135 is connected to the processor 9110 and may transmit and receives a radio signal such as an RF signal. The processor 9110 may control the transceiver 9135 to initiate communication and transmit radio signals including various types of information or data such as voice communication data. The transceiver 9135 includes a receiver and a transmitter to receive and transmit radio signals. The antenna 9140 facilitates the radio signal transmission and reception. In some implementations, upon receiving radio signals, the transceiver 9135 may forward and convert the signals to baseband frequency for processing by the processor 9110. Various techniques may be applied to the processed signals. For example, the processed signals may be transformed into audible or readable information to be output via the speaker 9145.

In some implementations, the sensor 9165 may be coupled to the processor 9110. The sensor 9165 may include one or more sensing devices configured to detect various types of information including, but not limited to, speed, acceleration, light, vibration, proximity, location, image, and so on. The processor 9110 may receive and process sensor information obtained from the sensor 9165 and perform various types of functions such as collision avoidance, autonomous driving, etc.

In the example of FIG. 24, various components (e.g., camera, universal serial bus (USB) port, etc.) may be further included in the UE. For example, a camera may be coupled to the processor 9110 and used for various services such as autonomous driving, vehicle safety services, etc.

The UE of FIG. 24 is merely exemplary, and implementations are not limited thereto. That is, in some scenarios, some components (e.g., keypad 9120, GPS chip 9160, sensor 9165, speaker 9145, and/or microphone 9150) may not be implemented in the UE.

Figure 25:
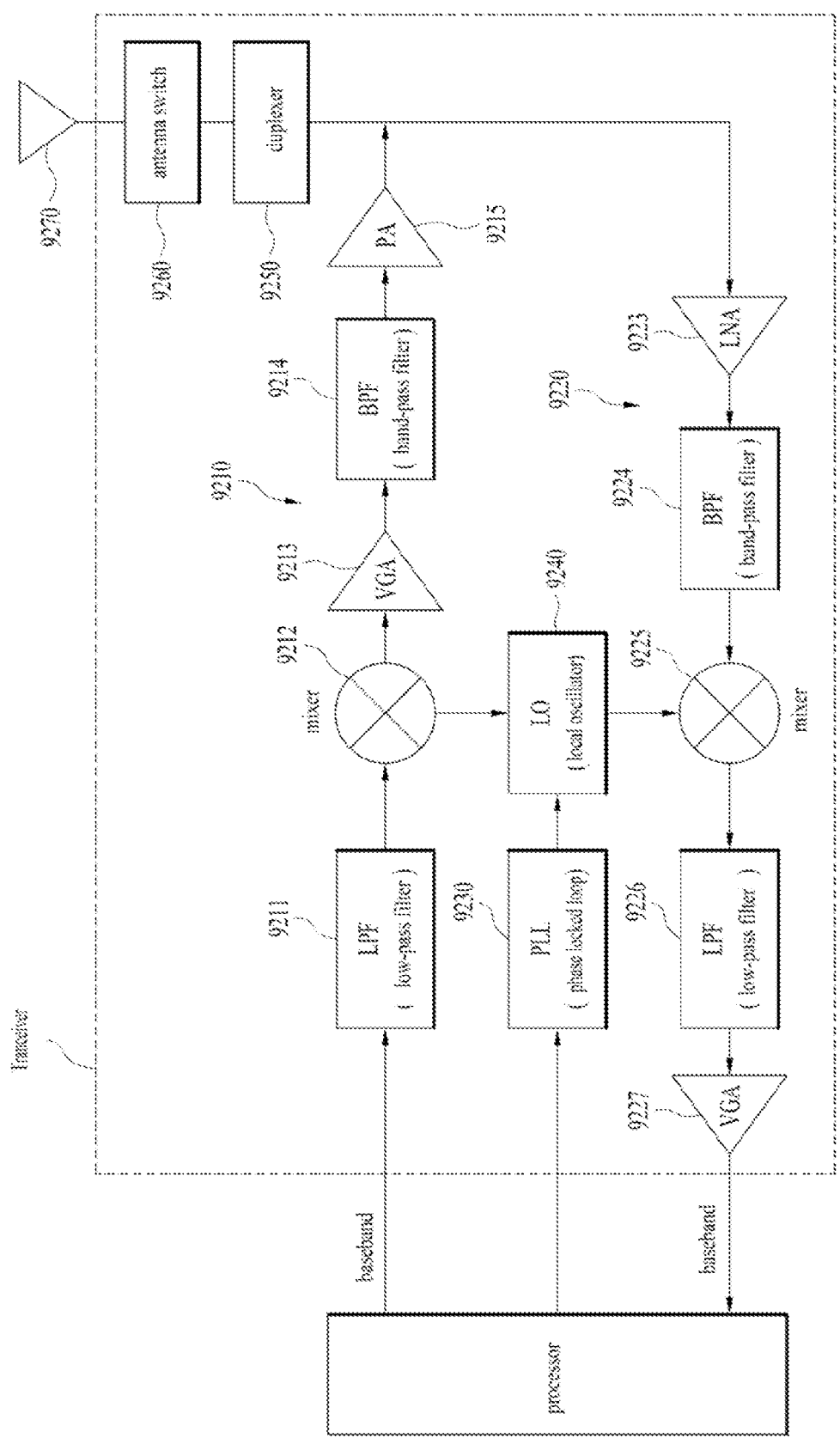

FIG. 25 illustrates a transceiver of a wireless communication device according to an implementation of the present disclosure. Specifically, FIG. 25 shows a transceiver that may be implemented in a frequency division duplex (FDD) system.

In the transmission path, at least one processor such as the processor described in FIGS. 22 and 23 may process data to be transmitted and then transmit a signal such as an analog output signal to a transmitter 9210.

In the transmitter 9210, the analog output signal may be filtered by a low-pass filter (LPF) 9211, for example, to remove noises caused by prior digital-to-analog conversion (ADC), upconverted from baseband to RF by an upconverter (e.g., mixer) 9212, and amplified by an amplifier 9213 such as a variable gain amplifier (VGA). The amplified signal may be filtered again by a filter 9214, further amplified by a power amplifier (PA) 9215, routed through duplexer 9250 and antenna switch 9260, and transmitted via an antenna 9270.

In the reception path, the antenna 9270 may receive a signal in a wireless environment. The received signal may be routed through the antenna switch 9260 and duplexer 9250 and sent to a receiver 9220.

In the receiver 9220, the received signal may be amplified by an amplifier such as a low noise amplifier (LNA) 9223, filtered by a band-pass filter 9224, and downconverted from RF to baseband by a downconverter (e.g., mixer) 9225.

The downconverted signal may be filtered by an LPF 9226 and amplified by an amplifier such as a VGA 9227 to obtain an analog input signal, which is provided to the at least one processor such as the processor.

Further, a local oscillator (LO) 9240 may generate and provide transmission and reception LO signals to the upconverter 9212 and downconverter 9225, respectively.

In some implementations, a phase locked loop (PLL) 9230 may receive control information from the processor and provide control signals to the LO 9240 to generate the transmission and reception LO signals at appropriate frequencies.

Implementations are not limited to the particular arrangement shown in FIG. 25, and various components and circuits may be arranged differently from the example shown in FIG. 25.

Figure 26:
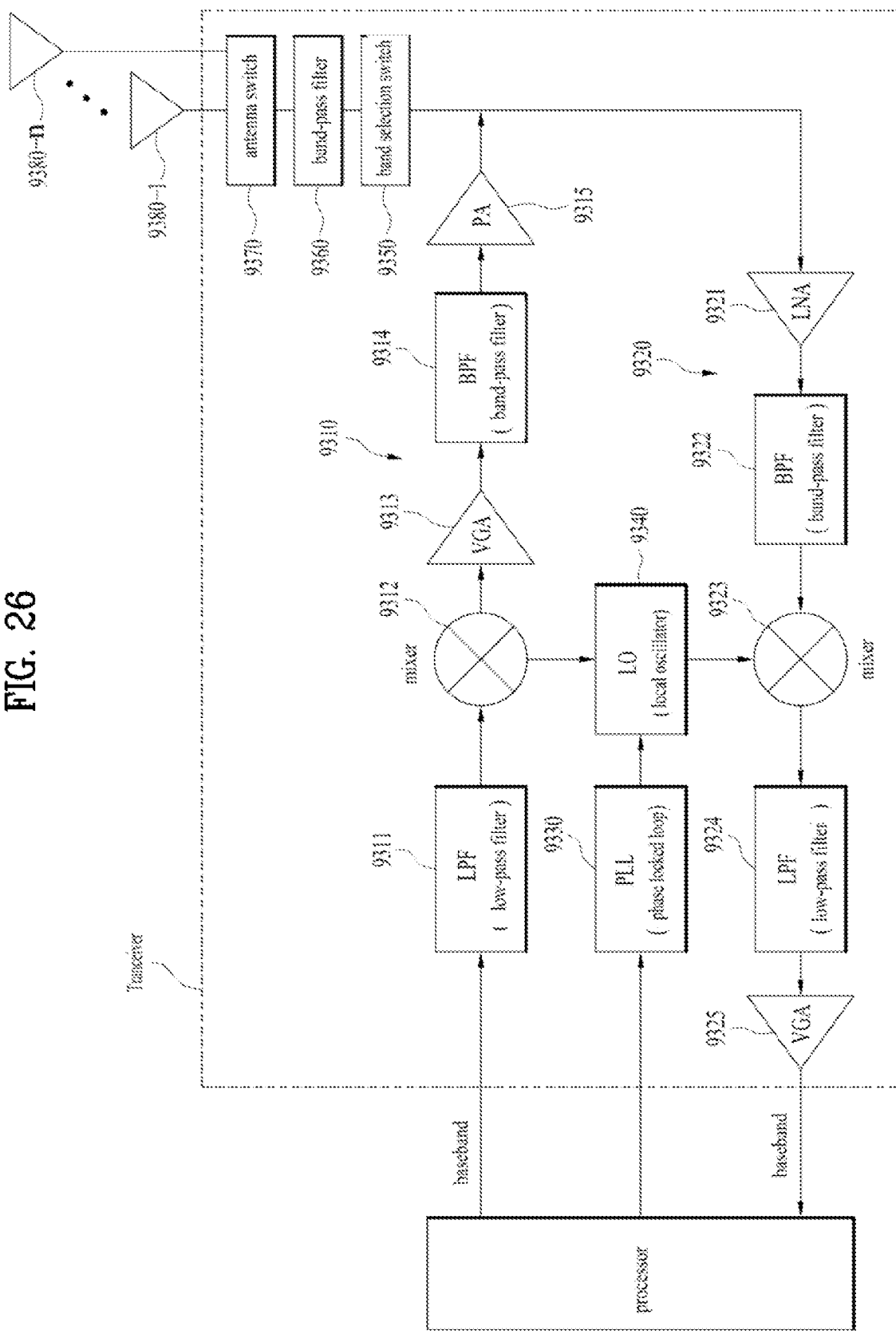

FIG. 26 illustrates a transceiver of a wireless communication device according to an implementation of the present disclosure. Specifically, FIG. 26 shows a transceiver that may be implemented in a time division duplex (TDD) system.

In some implementations, a transmitter 9310 and a receiver 9320 of the transceiver in the TDD system may have one or more similar features to those of the transmitter and the receiver of the transceiver in the FDD system. Hereinafter, the structure of the transceiver in the TDD system will be described.

In the transmission path, a signal amplified by a PA 9315 of the transmitter may be routed through a band selection switch 9350, a BPF 9360, and an antenna switch(s) 9370 and then transmitted via an antenna 9380.

In the reception path, the antenna 9380 may receive a signal in a wireless environment. The received signals may be routed through the antenna switch(s) 9370, the BPF 9360, and the band selection switch 9350 and then provided to the receiver 9320.

Figure 27:
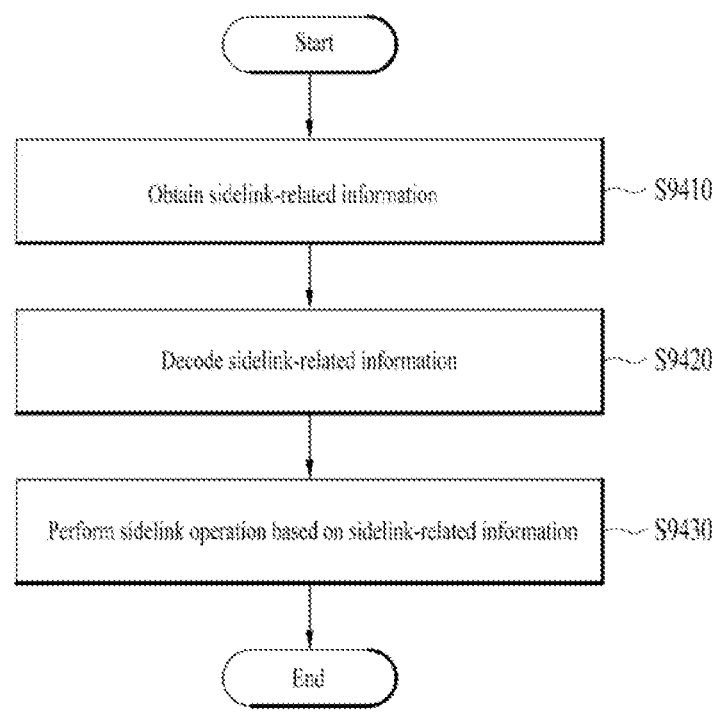

FIG. 27 illustrates sidelink operations of a wireless device according to an implementation of the present disclosure. The sidelink operations of the wireless device shown in FIG. 27 are merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, the sidelink operation may mean information transmission and reception between UEs. Various types of information may be transferred through the sidelink.

Referring to FIG. 27, the wireless device may obtain sidelink-related information in step S9410. The sidelink-related information may include at least one resource configuration. The wireless device may obtain the sidelink-related information from another wireless device or a network node.

After obtaining the sidelink-related information, the wireless device may decode the sidelink-related information in step S9420.

After decoding the sidelink-related information, the wireless device may perform one or more sidelink operations based on the sidelink-related information in step S9430. The sidelink operation(s) performed by the wireless device may include at least one of the operations described herein.

Figure 28:
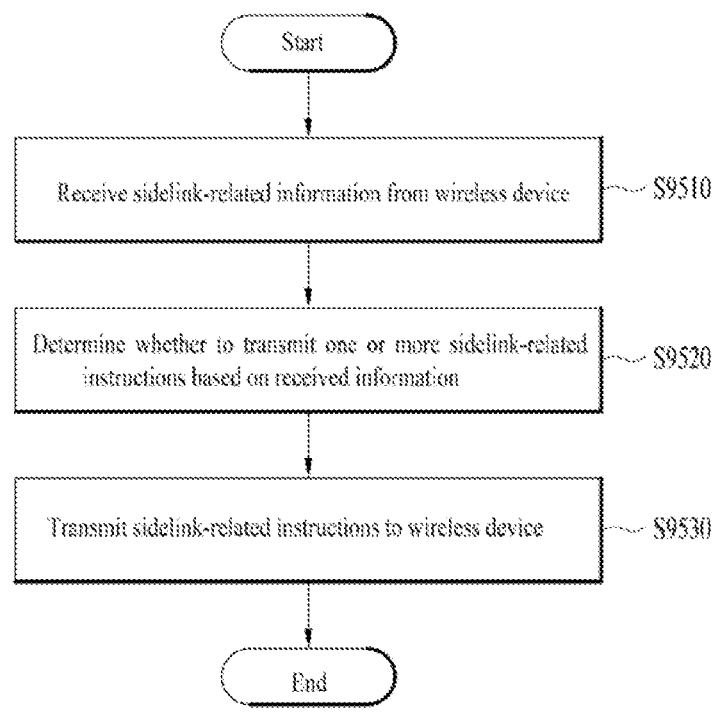

FIG. 28 illustrates sidelink operations of a network node according to an implementation of the present disclosure. The sidelink operations of the network node shown in FIG. 28 are merely exemplary, and the network node may perform sidelink operations based on various techniques.

Referring to FIG. 28, the network node may receive sidelink-related information from a wireless device in step S9510. For example, the sidelink-related information may correspond to Sidelink UE Information, which is used to provide sidelink information to a network node.

After receiving the sidelink-related information, the network node may determine whether to transmit one or more sidelink-related instructions based on the received information in step S9520.

When determining to transmit the sidelink-related instruction(s), the network node may transmit the sidelink-related instruction(s) to the wireless device in S9530. In some implementations, upon receiving the instruction(s) transmitted from the network node, the wireless device may perform one or more sidelink operations based on the received instruction(s).

Figure 29:
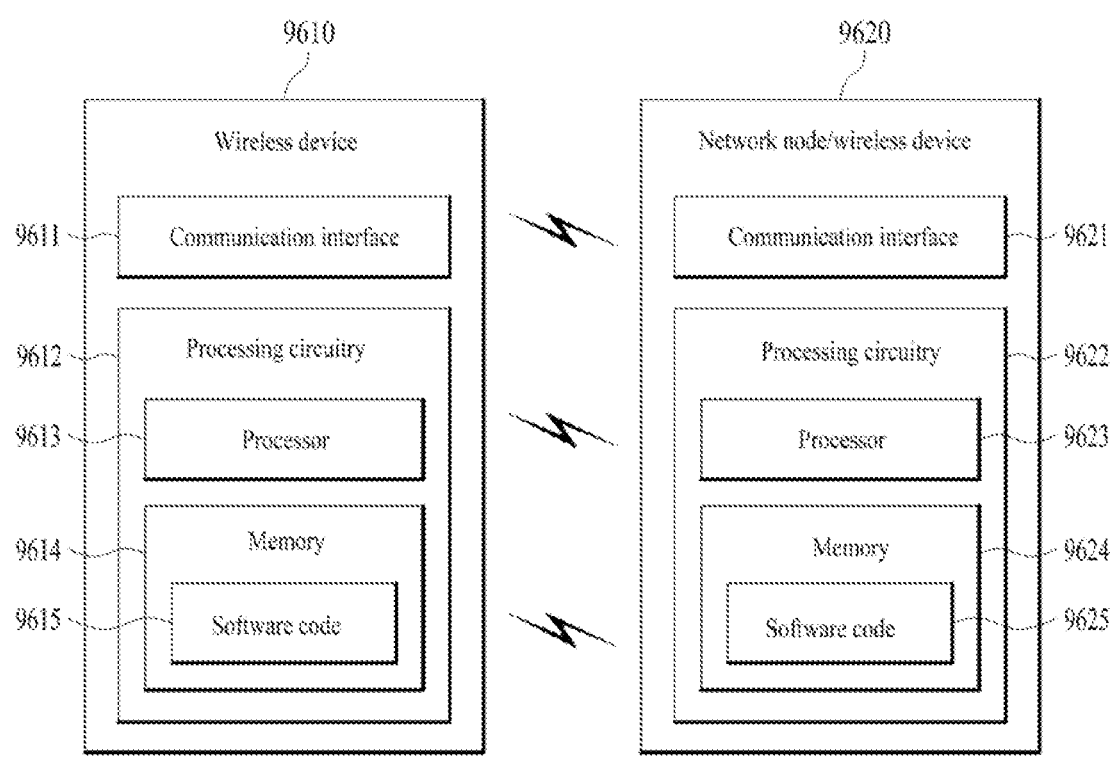

FIG. 29 illustrates the implementation of a wireless device and a network node according to an implementation of the present disclosure. The network node may be replaced with a wireless device or a UE.

Referring to FIG. 29, a wireless device 9610 may include a communication interface 9611 to communicate with one or more other wireless devices, network nodes, and/or other entities in the network. The communication interface 9611 may include one or more transmitters, one or more receivers, and/or one or more communications interfaces. The wireless device 9610 may include a processing circuitry 9612. The processing circuitry 9612 may include at least one processor such as a processor 9613 and at least one memory such as a memory 9614.

The processing circuitry 9612 may be configured to control at least one of the methods and/or processes described herein and/or enable the wireless device 9610 to perform the methods and/or processes. The processor 9613 may correspond to one or more processors for performing the wireless device functions described herein. The wireless device 9610 may include the memory 9614 configured to store the data, programmable software code, and/or information described herein.

In some implementations, the memory 9614 may store software code 9615 including instructions that allow the processor 9613 to perform some or all of the above-described processes when driven by the at least one processor such as the processor 9613.

For example, the at least one processor such as the processor 9613 configured to control at least one transceiver such as a transceiver 2223 may process at least one processor for information transmission and reception.

A network node 9620 may include a communication interface 9621 to communicate with one or more other network nodes, wireless devices, and/or other entities in the network. The communication interface 9621 may include one or more transmitters, one or more receivers, and/or one or more communications interfaces. The network node 9620 may include a processing circuitry 9622. The processing circuitry 9622 may include a processor 9623 and a memory 9624.

In some implementations, the memory 9624 may store software code 9625 including instructions that allow the processor 9623 to perform some or all of the above-described processes when driven by at least one processor such as the processor 9623.

For example, the at least one processor such as the processor 9623 configured to control at least one transceiver such as a transceiver 2213 may process at least one processor for information transmission and reception.

The above-described implementations may be embodied by combining the structural elements and features of the present disclosure in various ways. Each structural element and feature may be selectively considered unless specified otherwise. Some structural elements and features may be implemented without any combination with other structural elements and features. However, some structural elements and features may be combined to implement the present disclosure. The operation order described herein may be changed. Some structural elements or feature in an implementation may be included in another implementation or replaced with structural elements or features suitable for the other implementation.

The above-described implementations of the present disclosure may be embodied through various means, for example, hardware, firmware, software, or any combination thereof. In a hardware configuration, the methods according the present disclosure may be achieved by at least one of one or more ASICs, one or more DSPs, one or more DSPDs, one or more PLDs, one or more FPGAs, one or more processors, one or more controllers, one or more microcontrollers, one or more microprocessors, etc.

In a firmware or software configuration, the methods according to the present disclosure may be implemented in the form of a module, a procedure, a function, etc. Software code may be stored in a memory and executed by a processor. The memory may be located inside or outside the processor and exchange data with the processor via various known means.

Those skilled in the art will appreciate that the present disclosure may be carried out in other specific ways than those set forth herein without departing from the spirit and essential characteristics of the present disclosure. Although the present disclosure has been described based on the 3GPP LTE/LTE-A system or 5G system (NR system), the present disclosure is also applicable to various wireless communication systems.

INDUSTRIAL APPLICABILITY

The above-described implementations of the present disclosure are applicable to various mobile communication systems.

The invention claimed is:

1. A method for transmitting a signal by a sidelink UE in a wireless communications system, the method comprising the steps of:
   determining, a first transmission power used for a physical sidelink control channel (PSCCH) and a second transmission power per RE (Resource Element) of a physical sidelink shared channel (PSSCH);
   transmitting the PSCCH by using a plurality of symbols in a slot; and
   transmitting the PSSCH related to the PSCCH,
   wherein the number of symbols used for the PSCCH transmission is changed based on a change in the number of symbols included in the slot, and
   wherein based on that the PSCCH is FDMed (Frequency-division multiplexed) with the PSSCH in at least a portion of the slot, the first transmission power is excluded from a total available transmission power and then the second transmission power per RE is determined.

2. The method of claim 1, wherein a relationship between the number of symbols included in the slot and the number of symbols used for the PSCCH transmission is preconfigured, delivered through physical layer signaling or delivered through higher layer signaling.

3. The method of claim 1, wherein a payload size of the PSCCH or a size of a resource block (RB) to which the PSCCH is transmitted is changed based on the change in the number of symbols included in the slot.

4. The method of claim 1, wherein the determined transmission power is also used for a transmission power per RE of PSSCH which is not subjected to FDM with the PSCCH in at least a portion of the slot.

5. The method of claim 1, wherein MPR (Maximum Power Reduction) applied when the PSCCH is subjected to FDM with the PSSCH in at least a portion of the slot is applied even in the case that the PSCCH is not subjected to FDM with the PSSCH.

6. The method of claim 1, wherein the PSCCH is repeatedly transmitted through at least one symbol in the slot.

7. The method of claim 6, wherein the repeated transmission of the PSCCH is performed when the symbols used for the PSCCH transmission are smaller than those used for the PSSCH transmission related to the PSCCH.

8. The method of claim 6, wherein the repeatedly transmitted PSCCH has a redundancy version (RV) of a preconfigured pattern.

9. The method of claim 8, wherein the repeated transmission of the PSCCH or the preconfigured pattern is indicated by a demodulation reference signal (DMRS) for the PSCCH.

10. The method of claim 9, wherein the repeated transmission of the PSCCH or the preconfigured pattern is indicated by DMRS base sequence set to a predetermined value or initialization ID.

11. The method of claim 6, wherein the number of times for the repeated transmission is determined by a UE that transmits the PSCCH, by considering one or more of packet priority and packet arrival coverage.

12. A sidelink UE for transmitting or receiving a signal in a wireless communication system, the sidelink UE comprising:
   a memory; and
   a processor coupled to the memory,
   wherein the processor:
      determines a first transmission power used for a physical sidelink control channel (PSCCH) and a second transmission power per RE (Resource Element) of a physical sidelink shared channel (PSSCH), transmits the PSCCH by using a plurality of symbols in a slot, and transmits the PSSCH related to the PSCCH, and wherein the number of symbols used for the PSCCH transmission is changed based on a change in the number of symbols included in the slot, and wherein based on that the PSCCH is FDMed (Frequency-division multiplexed) with the PSSCH in at least a portion of the slot, the first transmission power is excluded from a total available transmission power and then the second transmission power per RE is determined.

* * * * *